(12) United States Patent
Takashina et al.

(10) Patent No.: US 11,207,897 B2
(45) Date of Patent: Dec. 28, 2021

(54) PRINTING JIG AND METHOD FOR MANUFACTURING PRINTED OBJECTS

(71) Applicant: CITIZEN WATCH CO., LTD., Tokyo (JP)

(72) Inventors: Taku Takashina, Yamanashi (JP); Jindai Yamakawa, Saitama (JP)

(73) Assignee: CITIZEN WATCH CO., LTD., Tokyo (JP)

( * ) Notice: Subject to any disclaimer, the term of this patent is extended or adjusted under 35 U.S.C. 154(b) by 468 days.

(21) Appl. No.: 16/095,754

(22) PCT Filed: Jan. 23, 2018

(86) PCT No.: PCT/JP2018/002030
§ 371 (c)(1),
(2) Date: Oct. 23, 2018

(87) PCT Pub. No.: WO2019/146005
PCT Pub. Date: Aug. 1, 2019

(65) Prior Publication Data
US 2021/0107294 A1    Apr. 15, 2021

(51) Int. Cl.
*B41J 3/407*    (2006.01)
*B41M 1/26*    (2006.01)
(Continued)

(52) U.S. Cl.
CPC .......... *B41J 3/40731* (2020.08); *B41J 3/4071* (2013.01); *B41J 11/002* (2013.01);
(Continued)

(58) Field of Classification Search
CPC .... B41J 3/40731; B41J 3/4071; B41J 11/002; B41M 1/26; B41M 5/0047
(Continued)

(56) References Cited

U.S. PATENT DOCUMENTS 6,295,251 B1    9/2001    Sakai et al.
6,554,510 B1    4/2003    Hayashi et al.
(Continued)

FOREIGN PATENT DOCUMENTS

CN    1271874 A    11/2000
CN    1649739 A    8/2005
(Continued)

OTHER PUBLICATIONS

WIPO, International Search Report for PCT Patent Application No. PCT/JP2018/002030, dated Mar. 13, 2018.
(Continued)

*Primary Examiner* — Leslie J Evanisko

(57) ABSTRACT

Provided are a printing jig for an inkjet-type printer and a method for manufacturing printed objects therewith, which jig can be easily produced in accordance with the shape and size of an object to be printed and allows the object to be accurately positioned relative to the printer. The printing jig supports an object to be printed, and is placed in an inkjet-type printer when the object is being printed. The printing jig includes a mounting surface on which the object is to be placed, and a positioning part for positioning the object. The positioning part includes a protrusion preformed on the mounting surface so as to be brought into contact with at least part of the object placed on the mounting surface. The protrusion is made of deposited and cured ink used by the inkjet-type printer.

13 Claims, 18 Drawing Sheets

(51) Int. Cl.
    *B41J 11/00*       (2006.01)
    *B41M 5/00*       (2006.01)
    *G04D 1/06*       (2006.01)
    *G04B 19/06*     (2006.01)

(52) U.S. Cl.
    CPC ............ B41M 1/26 (2013.01); B41M 5/0047 (2013.01); G04D 1/06 (2013.01); G04B 19/06 (2013.01)

(58) Field of Classification Search
    USPC .................................. 101/407.1; 347/4, 104
    See application file for complete search history.

(56) References Cited

U.S. PATENT DOCUMENTS

| | | | |
|---|---|---|---|
| 6,599,613 | B1 | 7/2003 | Kasahara et al. |
| 2006/0075917 | A1 | 4/2006 | Edwards |
| 2014/0087151 | A1 | 3/2014 | Davidson |
| 2015/0085627 | A1 | 3/2015 | Hiranura et al. |
| 2018/0022123 | A1* | 1/2018 | Del-Aguila .......... B41J 3/40731 347/37 |

FOREIGN PATENT DOCUMENTS

| | | | |
|---|---|---|---|
| CN | 101421074 | A | 4/2009 |
| CN | 102271924 | A | 12/2011 |
| CN | 102300653 | A | 12/2011 |
| CN | 104460287 | A | 3/2015 |
| CN | 204414824 | U | 6/2015 |
| CN | 206106664 | U | 4/2017 |
| CN | 206170887 | U | 5/2017 |
| CN | 206470542 | U | 9/2017 |
| EP | 2 380 679 | A1 | 10/2011 |
| EP | 2 447 045 | A2 | 5/2012 |
| EP | 3090877 | A1 * | 11/2016 ........... B29C 64/182 |
| JP | 2001-031254 | A | 2/2001 |
| JP | 2005-183802 | A | 7/2005 |
| JP | 2008-162110 | A | 7/2008 |
| JP | 2011-104875 | A | 6/2011 |
| JP | 2012-000603 | A | 1/2012 |
| JP | 2018114702 | A * | 7/2018 |
| JP | 2018144451 | A * | 9/2018 |
| WO | 2001/015123 | A1 | 3/2001 |
| WO | 03/091035 | A1 | 11/2003 |
| WO | 2005/076799 | A2 | 8/2005 |
| WO | 2010/093376 | A1 | 8/2010 |

OTHER PUBLICATIONS

WIPO, International Preliminary Report on Patentability with Written Opinion for PCT Patent Application No. PCT/JP2018/002030, dated Mar. 13, 2018.
China National Intellectual Property Administration, Office Action and search report for Chinese Patent Application No. 201880087366.3, dated Apr. 25, 2021 (partial translation of the Chinese office action is attached hereto).
European Patent Office, Extended European Search Report for Eurpean Patent Application No. 18902915.0, dated Aug. 24, 2021.
China National Intellectual Property Administration, the Second Office Action for Chinese Patent Application No. 201880087366.3, dated Sep. 22, 2021.

* cited by examiner

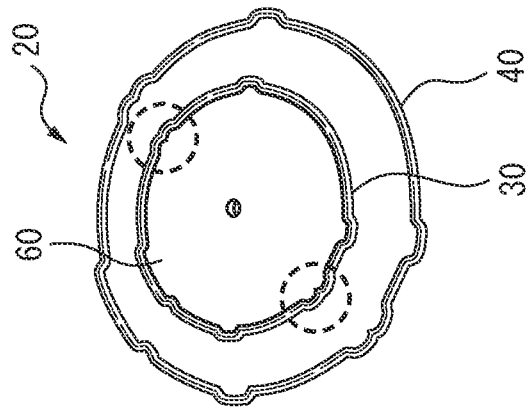
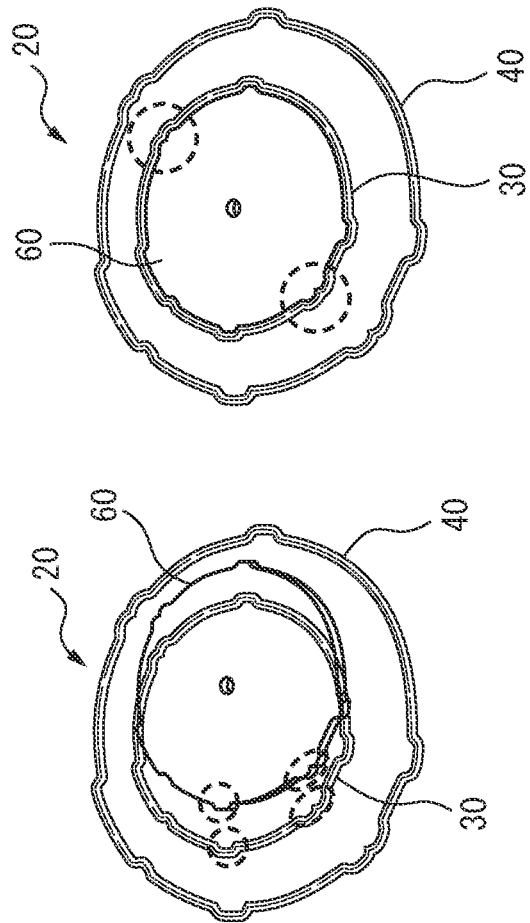
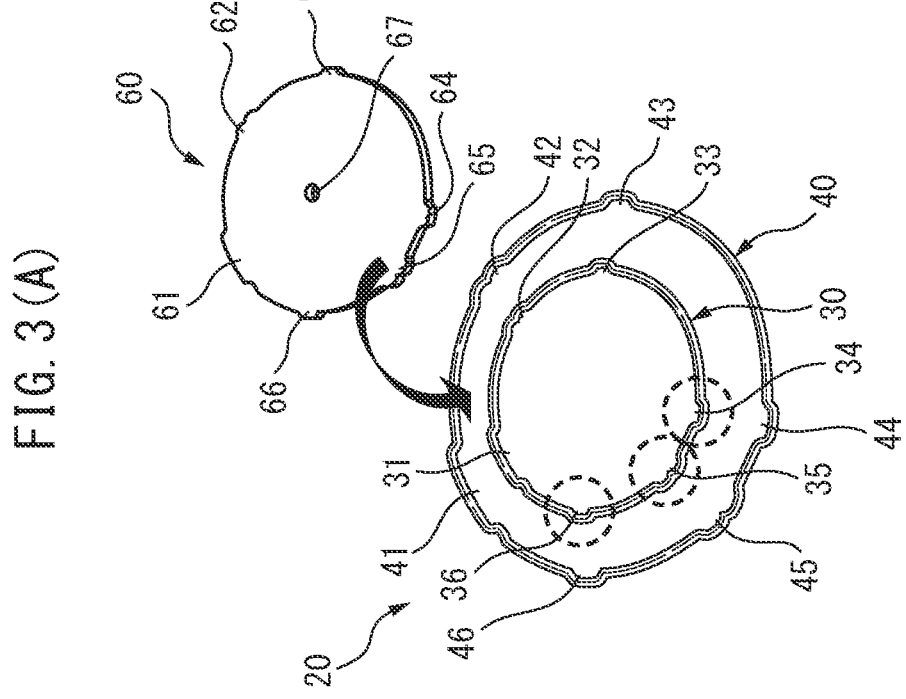

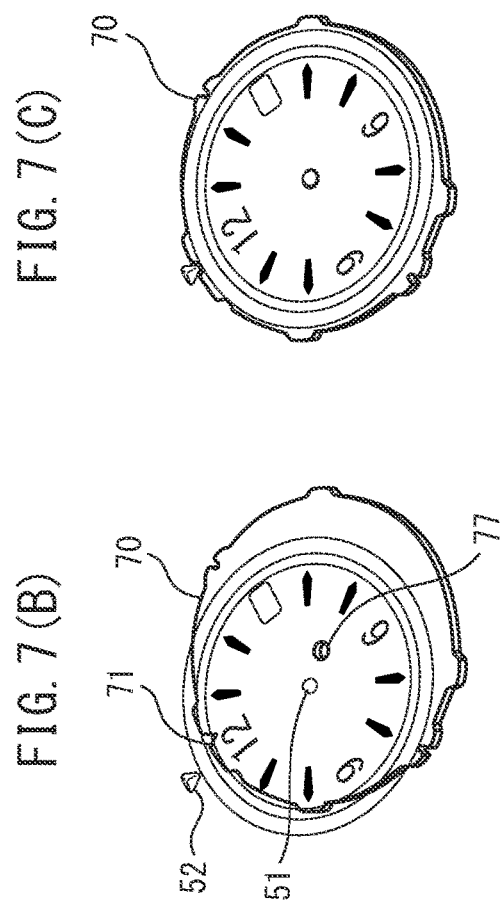
FIG. 7(B)
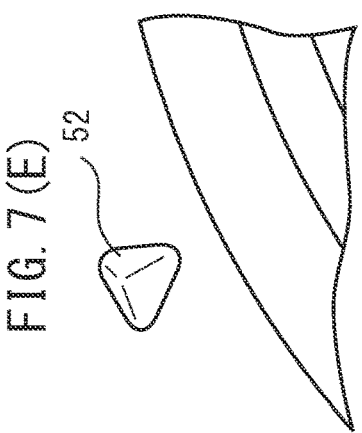
FIG. 7(C)
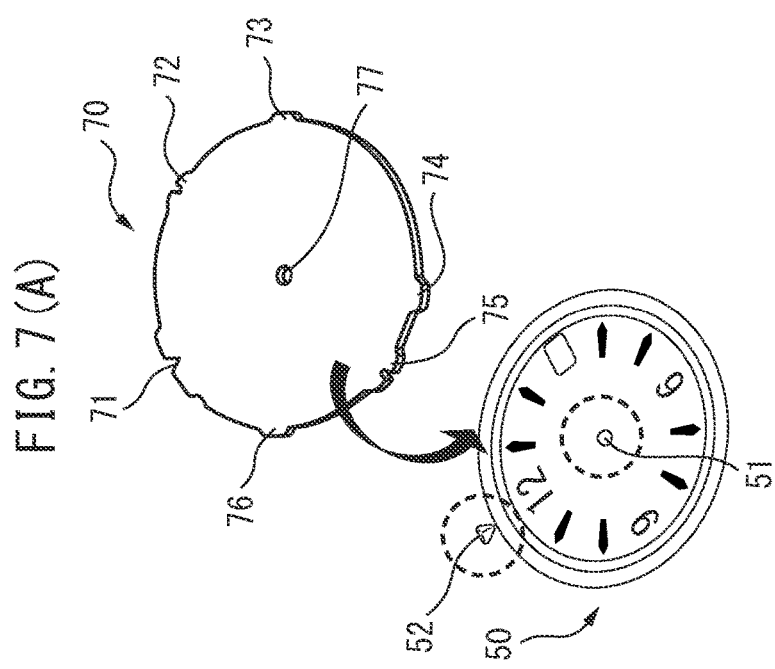
FIG. 7(A)
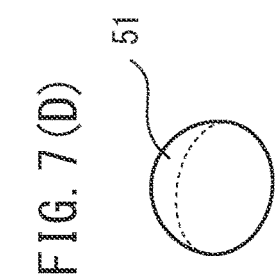
FIG. 7(E)
FIG. 7(D)

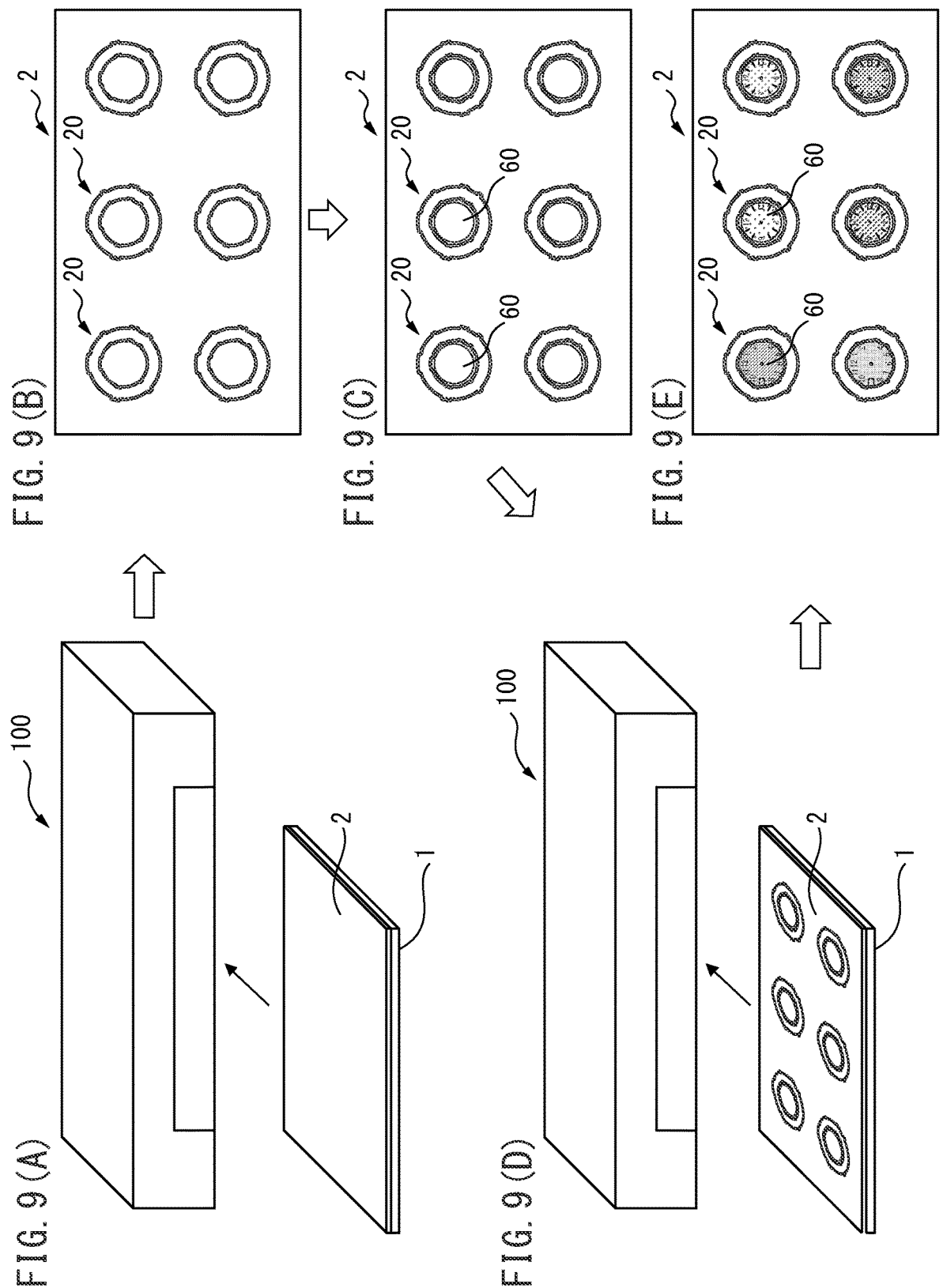

PRINTING JIG AND METHOD FOR MANUFACTURING PRINTED OBJECTS

FIELD

The present invention relates to a printing jig and a method for manufacturing printed objects.

BACKGROUND

Patent Literature 1 describes a printing jig for a three-dimensional object. This printing jig includes: a planar or three-dimensional object-mounting means having openings for positioning and fixing a three-dimensional object to be printed so that its surface to be printed faces an ink application means of an inkjet-type printer; an object-attachment means having sticks detachably engaged upright in the openings; and a bed-fixing means detachably fixing the object-mounting means onto a printing bed moving in the direction orthogonal to the direction of movement of the ink application means in synchronization with the operation of the printer.

CITATIONS LIST

Patent Literature

Patent Literature 1: Japanese Unexamined Patent Publication No. 2012-000603

SUMMARY

Indicator panels, such as dials of timepieces, are manufactured by pad printing or screen printing thereon designs including colors and patterns. The use of inkjet printing for producing such indicator panels allows for printing designs which cannot be represented by pad printing and screen printing. However, since the indicator panels have various shapes and designs, actual printing on them requires forming jigs for fixing objects to be printed, out of a metal in accordance with the shapes of the objects on a one-by-one basis. Therefore, inkjet printing results in higher cost for jigs than other conventional techniques.

In general, when an object is placed on a stage and subjected to inkjet printing, unless the object is fixed, it is difficult to print constantly on the same areas of the object, and print misalignment may occur. In particular, since many timepiece components, such as dials, are small in size, accurate positioning of the object is required during printing, in order to prevent the occurrence of print misalignment. The printing jig of Patent Literature 1 is a jig used in an inkjet-type printer; however, from the viewpoint of application to printing on timepiece components, it further requires a means for more strictly positioning the object placed on the object-mounting means so that displacements of the object may not occur. Further, the printing jig of Patent Literature 1 may not be flexibly applied to inkjet printing on objects having a wide variety of shapes and sizes.

It is an object of the present invention to provide a printing jig for an inkjet-type printer and a method for manufacturing printed objects therewith, which jig can be easily produced in accordance with the shape and size of an object to be printed and allows the object to be accurately positioned relative to the printer.

A printing jig which supports an object to be printed and is placed in an inkjet-type printer when the object is being printed is provided. The printing jig includes a mounting surface on which the object is to be placed, and a positioning part for positioning the object, the positioning part including a protrusion preformed on the mounting surface so as to be brought into contact with at least part of the object placed on the mounting surface, wherein the protrusion is made of deposited and cured ink used by the inkjet-type printer.

Preferably, in the printing jig, the object is a flat-shaped member, and the protrusion is placed so as to be brought into contact with a lateral side of the object at two or more positions, for positioning the object in a rotational direction and two perpendicular directions in the mounting surface.

Preferably, in the printing jig, the object is an indicator panel, the indicator panel includes an uneven portion on a lateral side thereof, the uneven portion having projections and recesses in the circumferential direction of the indicator panel, and the protrusion is placed so as to be brought into contact with at least the uneven portion of the indicator panel.

Preferably, in the printing jig, the indicator panel is a dial of a timepiece, the uneven portion of the dial is an engagement portion which is to be engaged with a movement or an inner frame holding the movement, and the protrusion is placed so as to be brought into contact with at least the engagement portion of the dial.

Preferably, in the printing jig, the indicator panel is a dial of a timepiece, the uneven portion of the dial includes a recess formed at a 12 o'clock position of the rim of the dial, and the protrusion is formed so as to be brought into contact with the recess on the rim of the dial.

Preferably, in the printing jig, the protrusion has a wall shape so as to surround the indicator panel placed on the mounting surface and be brought into contact with the lateral side of the indicator panel, the positioning part further includes a second protrusion, and the second protrusion has a shape similar to that of the protrusion, and is made of the ink deposited and cured on the mounting surface outside the protrusion so as to surround the protrusion.

Preferably, in the printing jig, the protrusion has a cut on the circumference thereof.

Preferably, in the printing jig, the uneven portion of the indicator panel is asymmetric with respect to the center of the indicator panel, and the protrusion is placed so as to match the asymmetric uneven portion, in order that the indicator panel may not be placed on the mounting surface upside down.

Preferably, in the printing jig, the object is a timepiece component having a projection on a bottom thereof, and the protrusion is placed so as to be brought into contact with the projection of the timepiece component.

Preferably, in the printing jig, the protrusion has a recess into which the projection of the timepiece component placed on the mounting surface is fitted.

Preferably, in the printing jig, the outer diameter of the protrusion is smaller than that of the timepiece component.

Preferably, in the printing jig, the object is a timepiece component having an opening, and the protrusion is placed so as to be brought into contact with an inner wall of the opening of the timepiece component.

Preferably, in the printing jig, objects on which different prints are to be made can be placed on the mounting surface side by side, and markings respectively corresponding to the prints are printed in advance at respective positions on the mounting surface where the objects are to be placed.

Provided is a method for manufacturing printed objects, the method including the steps of: forming any one of the above printing jigs, including depositing ink by inkjet printing on a mounting surface of a jig plate or a jig sheet which can be placed in an inkjet-type printer, and curing the ink to form the protrusion; placing an object to be printed on the mounting surface so that at least part of the object comes into contact with the protrusion, thereby positioning the object relative to the protrusion; and inkjet printing on the object.

Preferably, the same printer is used in the steps of forming the printing jig and inkjet printing on the object.

According to the present invention, the printing jig can be easily produced in accordance with the shape and size of an object to be printed and allows the object to be accurately positioned relative to the inkjet-type printer.

BRIEF DESCRIPTION OF DRAWINGS

FIGS. 3(A) to 3(C) are an enlarged view of one of the positioning parts 20 and a dial 60, and diagrams for illustrating how to fix the dial 60 to the positioning part 20.

FIGS. 7(A) to 7(E) are enlarged views of one of the positioning parts 50 and a dial 70, and diagrams for illustrating how to fix the dial 70 to the positioning part 50.

FIGS. 9(A) to 9(E) are conceptual diagrams for illustrating how to print on the dials 60.

DESCRIPTION OF EMBODIMENTS

Hereinafter, with reference to the accompanying drawings, a printing jig and a method for manufacturing printed objects will be explained in detail. However, it should be noted that the present invention is not limited to the drawings or the embodiments described below.

A description will be given below mainly of examples where the object to be printed is a dial of a timepiece (more specifically, a dial substrate which becomes a dial by being printed). The dial of a timepiece is an example of the indicator panel. The printing jig is a jig for inkjet printing which supports objects to be printed and is placed in an inkjet-type printer when the objects are being printed. More specifically, this printing jig includes protrusions formed by inkjet printing on a sheet (jig sheet) or plate (jig plate) on which the objects are placed. In a printing step of dials wherein this printing jig is used, the objects are placed on the jig sheet or jig plate, and then positioned and fixed by the protrusions, and further a design layer is formed on the objects by inkjet printing.

Figure 1A:
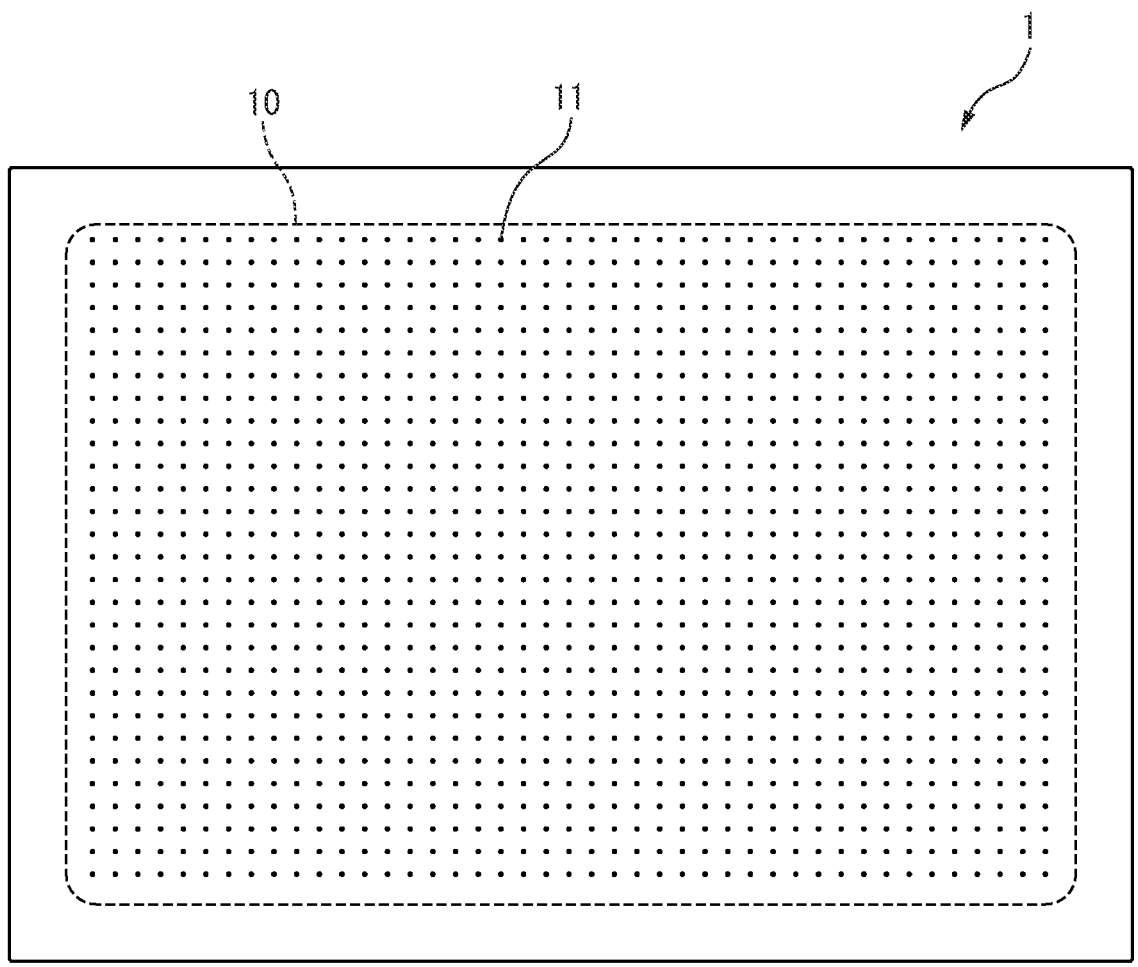
FIGS. 1(A) and 1(B) are a plan view and a cross-sectional view of a jig plate 1.
Figure 1B:

FIGS. 1(A) and 1(B) are a plan view and a cross-sectional view of a jig plate 1, respectively. The jig plate 1 functions as a tray supporting a jig sheet on which dials (objects to be printed) are placed, and is placed in an inkjet-type printer during printing on the dials. As an example, the jig plate 1 has a size of several tens of centimeters in length and breadth and several millimeters in thickness. The region which is indicated by reference numeral 10 and covers substantially all the upper surface of the jig plate 1 is a mounting surface on which the jig sheet is placed. The mounting surface 10 is provided with a large number of ventilating openings 11 for fixing the jig sheet to the jig plate 1, and other openings (not shown) for fixing the jig plate 1 around the mounting surface 10, e.g., at the four corners of the jig plate 1. The openings 11 are formed at a small pitch of a dozen or so millimeters, for example, in accordance with the size of the dials (objects to be printed) so that each object covers multiple openings 11 no matter where the objects are placed on the mounting surface 10.

Figure 2:
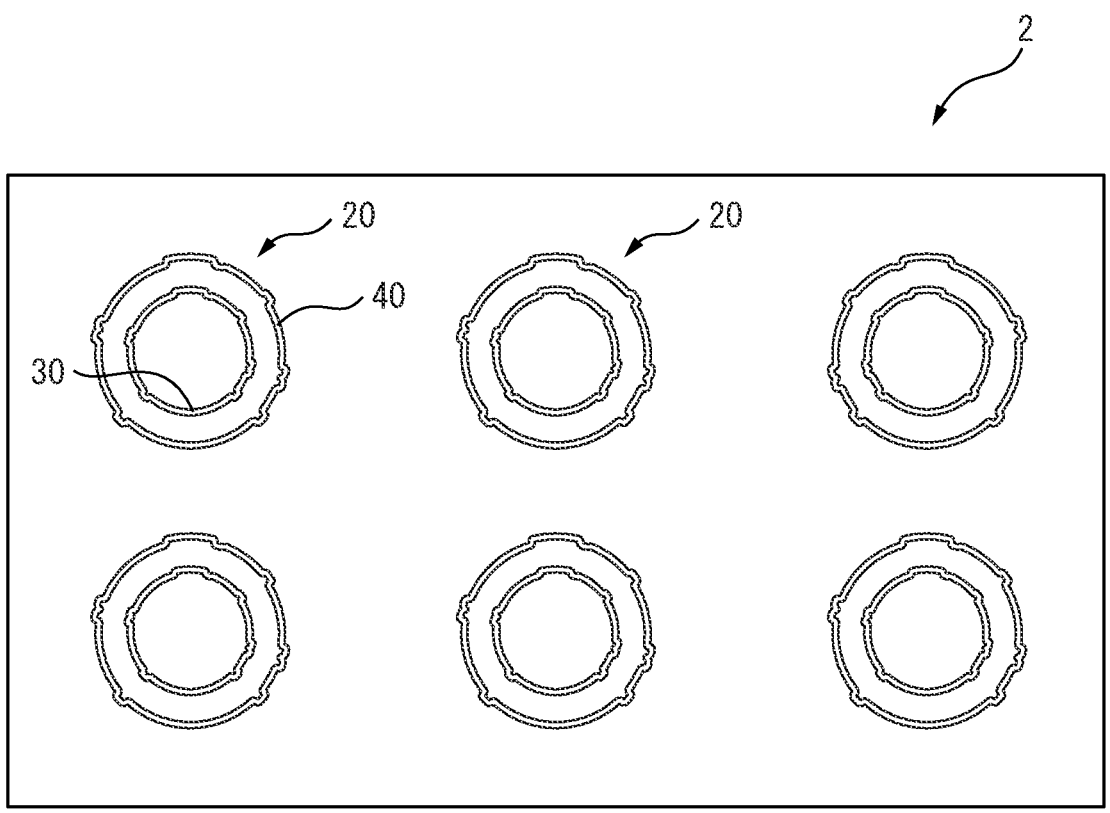
FIG. 2 is a plan view of a jig sheet 2.

FIG. 2 is a plan view of a jig sheet 2. The jig sheet 2 is a sheet-shaped member which supports the dials (objects to be printed) and is placed on the mounting surface 10 of the jig plate 1, and includes positioning parts 20 for positioning the dials. The jig sheet 2 is positioned relative to the jig plate 1 by aligning the right-angled corners thereof with the corners of the mounting surface 10 of the jig plate 1, for example. In the illustrated example, the printing jig is composed of the jig plate 1 and the jig sheet 2. Therefore, the upper surface of the jig sheet 2 may be referred to as the mounting surface on which the objects to be printed are placed.

Unlike the illustrated example, the positioning parts 20 may be directly formed on the jig plate 1 without using the jig sheet 2, and the dials may be placed on the jig plate 1. In this case, the printing jig is composed of only the jig plate 1. However, preparing two or more jig sheets 2 for one jig plate 1 has the advantage of improving manufacturing efficiency because, while the jig plate 1 and one of the jig sheets 2 are used for printing on dials, other dials can be arranged and prepared on another jig sheet 2. The jig sheet 2 may be directly placed in an inkjet-type printer and perform printing without using the jig plate 1, if it can be fixed by some means. In this case, the printing jig is composed of only the jig sheet.

On the jig sheet 2, multiple dials can be placed side by side. FIG. 2 shows an example where six positioning parts 20 are formed so that six dials can be placed. Each positioning part 20 is composed of wall-shaped protrusions 30 and 40, which are formed in accordance with the shape and size of dials placed on the respective positioning parts 20. The positioning parts 20 may have the same shape and size, or have shapes and sizes different from each other.

FIGS. 3(A) to 3(C) are an enlarged view of one of the positioning parts 20 and a dial 60, and diagrams for illustrating how to fix the dial 60 to the positioning part 20.

The dial (dial substrate) 60 is a substantially circular flat-shaped (disc-shaped) member having a diameter of several centimeters and a thickness of several hundreds of micrometers, for example. The printing surface and mounting surface of the dial 60 may be formed smoothly, or have a rugged pattern or a scratch-brush finish. In the example shown in FIG. 3(A), the dial 60 includes six uneven portions on the side surface (lateral side) thereof, and an opening (center hole 67 through which a hand shaft passes) at the center thereof. An inner wall of the dial 60, such as that of the center hole 67, is also an example of the lateral side.

Hereinafter, these uneven portions will be referred to as uneven portions 61 to 66 in clockwise order from the one placed at the 12 o'clock position of the dial 60. In the illustrated example, the uneven portions 61 to 66 are asymmetric with respect to the center of the dial 60. The uneven portions 61, 63, 64 and 66 project in the radial direction from the rim of the circular dial 60. The uneven portions 62 and 65 project in the radial direction from the rim of the circular dial 60, and each include a recess (recess 65A described later) at the center thereof.

The wall-shaped protrusion 30 is a protrusion constituting the positioning part 20, and is three-dimensionally preformed by inkjet printing so as to bulge on the upper surface of the jig sheet 2. The wall-shaped protrusion 30 is formed on the upper surface of the jig sheet 2 in line with the outer shape of the dial 60 so as to be brought into contact with the lateral side thereof when the dial 60, which is an object to be printed, is placed on the upper surface (mounting surface) of the jig sheet 2. More specifically, the wall-shaped protrusion 30 has such a shape and size that the dial 60 is just fitted therein so as to fix all the rim of the dial 60, and thus includes six uneven portions into which the uneven portions 61 to 66 of the dial 60 are respectively fitted. Hereinafter, the uneven portions of the wall-shaped protrusion 30 respectively corresponding to the uneven portions 61 to 66 will be referred to as jig-side uneven portions 31 to 36.

In the illustrated example, the wall-shaped protrusion 30 surrounds all the rim of the dial 60, and is brought into contact with all the lateral side of the dial 60. However, the wall-shaped protrusion 30 need not necessarily surround all the rim of the dial 60, and may be placed so as to be brought into contact with at least the uneven portions 61 to 66 of the dial 60. Alternatively, the wall-shaped protrusion 30 may be placed so as to be brought into contact with at least two uneven portions on the side surface of the dial 60 (in other words, two or more of the uneven portions 61 to 66), for positioning and fixing the dial 60 in a rotational direction (θ direction) and two perpendicular directions (XY directions) in the upper surface (mounting surface) of the jig sheet 2.

The wall-shaped protrusion 40 is an example of the second protrusion, and constitutes the positioning part 20 together with the wall-shaped protrusion 30. The wall-shaped protrusion 40 is also three-dimensionally preformed by inkjet printing together with the wall-shaped protrusion 30 so as to bulge on the upper surface of the jig sheet 2. The wall-shaped protrusion 40 is formed outside the wall-shaped protrusion 30 so as to surround it, has the same shape as the wall-shaped protrusion 30, and is larger than the wall-shaped protrusion 30. More specifically, the wall-shaped protrusion 40 includes jig-side uneven portions 41 to 46 which have shapes similar to those of the jig-side uneven portions 31 to 36 of the wall-shaped protrusion 30. The wall-shaped protrusion 40 does not have the function of positioning and fixing the dial 60, since it is not brought into contact with the dial 60 placed on the jig sheet 2. The wall-shaped protrusion 40 is provided as a guide such that an operator can easily understand the positions of the jig-side uneven portions 31 to 36 of the wall-shaped protrusion 30.

Since the print head moves at high speed and thereby generates a current of air in an inkjet-type printer, an unfixed dial 60 may move during printing, which causes displacements thereof. Therefore, each printed positioning part 20 (in particular, the wall-shaped protrusion 30) needs to have a height (thickness) sufficient to fix the dial 60 onto the jig sheet 2. However, since too thick positioning parts 20 hinder an operator from attaching and removing dials 60, it is preferred that the positioning parts 20 have an appropriate thickness which does not degrade workability. From these viewpoints, it is preferred that the positioning parts 20 be as thick as the dials 60.

As shown in FIGS. 3(B) and 3(C), in order to fix the dial 60 to the positioning part 20, it is sufficient to fit the uneven portions 61 to 66 of the dial 60 into the jig-side uneven portions 31 to 36 of the wall-shaped protrusion 30, respectively. Since an operator only needs to put dials 60 on the jig sheet 2 as if to put pieces of a puzzle together, the dials 60 can be easily positioned and fixed. In particular, since the wall-shaped protrusion 40 larger than the wall-shaped protrusion 30 is provided as a guide, the operator can easily identify the positions of the jig-side uneven portions 31 to 36, which improves the accuracy of work for placing the dials 60 on the jig sheet 2 and its workability. Further, in the illustrated example, since the uneven portions 61 to 66 and the jig-side uneven portions 31 to 36 are asymmetrically formed, even if the operator tries to place the dial 60 upside down, the uneven portions 61 to 66 cannot be fitted into the jig-side uneven portions 31 to 36. This can also prevent the operator from erroneously placing the dial 60 upside down.

An inkjet-type printer drips ink on the jig sheet 2 and cures it. At this time, since the ink spreads out due to wettability, the surfaces of the wall-shaped protrusions 30 and 40 naturally curve, which causes the vertical cross sections thereof to have round shapes. Since each dial is guided by this curved surface, the use of inkjet printing naturally makes the wall-shaped protrusions 30 and 40 suitable for attachment and removal of the dials.

The color of the wall-shaped protrusions 30 and 40 can be arbitrarily chosen, since they are formed by inkjet printing. Forming the wall-shaped protrusions 30 and 40 in a conspicuous color on the jig sheet 2 allows an operator to easily understand the positions of the jig-side uneven portions 31 to 36, which further facilitates work for placing the dials 60.

Figure 4C:
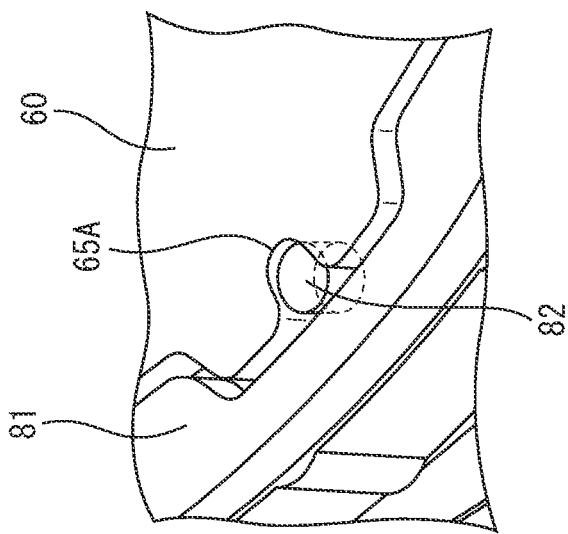
FIGS. 4(A) to 4(C) are diagrams for explaining engagement portions of the dial 60 engaged with a movement of a timepiece.
Figure 4B:
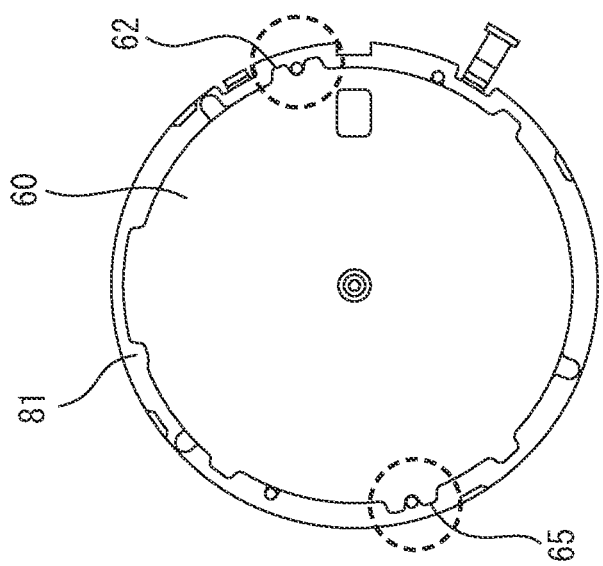
Figure 4A:
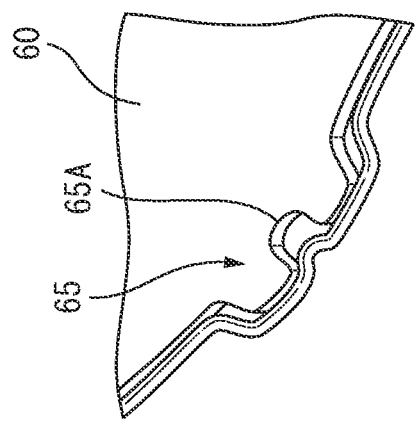

FIGS. 4(A) to 4(C) are diagrams for explaining engagement portions of the dial 60 engaged with a movement of a timepiece. The lateral side of each dial 60 includes engagement portions for engaging the dial 60 with a movement of a timepiece by means of bosses. In the illustrated example, the uneven portions 62 and 65 of the dial 60 correspond to the engagement portions which are to be engaged with the movement fixed to the dial 60.

FIG. 4(A) is an enlarged view of the uneven portion 65. The uneven portion 65 includes a recess 65A into which a boss for fixing is fitted. The uneven portion 62, which is placed on the side opposite to the uneven portion 65 with respect to the center of the dial 60, also has the same shape as the uneven portion 65. FIG. 4(B) shows the dial 60 fixed to an inner frame 81 of a timepiece. Although not shown in FIG. 4(B), the movement of the timepiece is disposed under the dial 60, which is fixed by bosses fitted into the uneven portions 62 and 65. FIG. 4(C) is a partial enlarged view of FIG. 4(B), and shows the recess 65A of the uneven portion 65 with a boss 82 fitted therein. The boss 82 provided for the movement or for the inner frame 81 holding the movement fixes the dial 60 to the movement.

As described above, the dial 60 is fixed to the movement at two positions, i.e., at the uneven portions 62 and 65. Since the dimensions of the engagement portions on the rim of the dial 60 which are engaged with the movement are strictly controlled, it is preferred to use at least the uneven portions 62 and 65, which are the engagement portions, for positioning and fixing the dial 60 on the jig sheet 2. More specifically, the wall-shaped protrusion 30 need not necessarily surround all the rim of the dial 60 as already described, but is preferably formed at positions where it is brought into contact with at least the engagement portions (uneven portions 62 and 65) of the dial 60. In particular, the use of the engagement portions for positioning during printing further prevents the occurrence of print misalignment. The uneven portions which have strictly controlled dimensions and are used as the engagement portions are not limited to the uneven portions 62 and 65, and may be provided at other positions, such as the 12 o'clock position.

For example, when printing is performed on transparent dials to produce blue dials, blue is first printed on the rear side of the transparent dials, and white is further printed thereon in order to make the blue clear. Then, the dials are turned upside down, and symbols (indices) are printed on the front side thereof. In this way, printing is often performed on both sides of the dials in the actual printing step, and in this case, a jig sheet for front surface printing and a jig sheet for rear surface printing are prepared. The jig sheet for front surface printing includes wall-shaped protrusions having jig-side uneven portions formed so as to match the uneven portions 61 to 66 of the dials 60 placed with the front surfaces thereof facing upward. The jig sheet for rear surface printing includes wall-shaped protrusions having jig-side uneven portions formed so as to match the uneven portions 61 to 66 of the dials 60 placed with the rear surfaces thereof facing upward.

Although not shown, for example, an identification code such as a barcode may be assigned to the jig sheet 2, and associated with information such as the date of manufacture and manufacturing conditions of the dials 60, thereby providing the jig sheet 2 with a traceability function. Further, a component code which is generally assigned to each dial 60 may be associated with the identification code of the jig sheet 2.

The above description has been given by dealing with the example where the uneven portions 61 to 66 project from the rim of the circular dial 60; however, the uneven portions may be recesses depressed in the rim of the circular dial 60. In this case also, a wall-shaped protrusion which includes projections having shapes matching these recesses on the lateral side in the circumferential direction thereof may be provided to similarly position the dial 60.

Figure 5A:
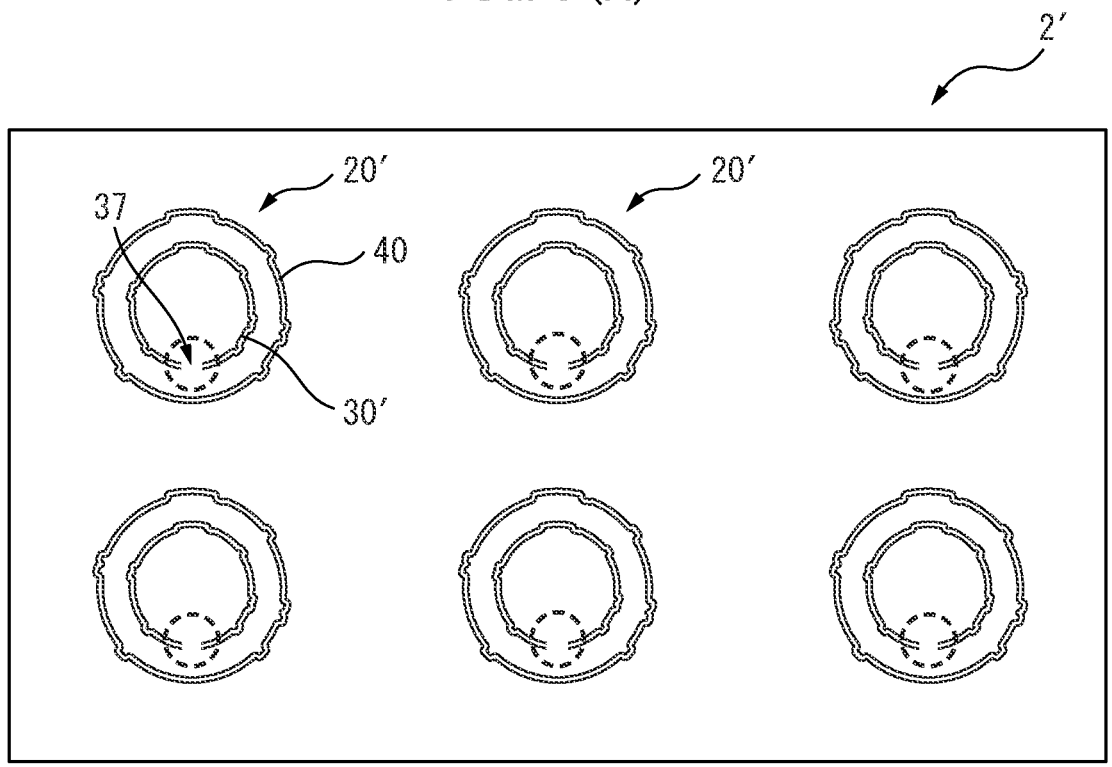
FIGS. 5(A) and 5(B) are plan views of jig sheets 2' and 2".
Figure 5B:
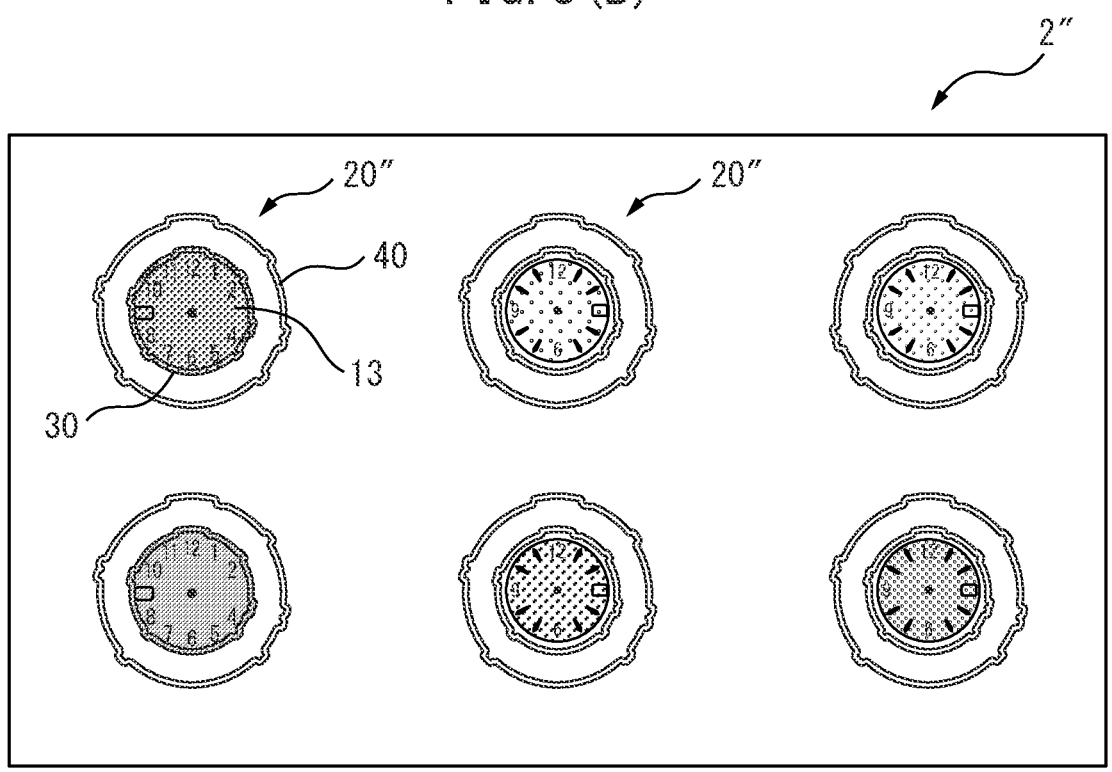

FIGS. 5(A) and 5(B) are plan views of jig sheets 2' and 2", respectively. Each of the positioning parts 20' (wall-shaped protrusions 30') of the jig sheet 2' shown in FIG. 5(A) has a cut 37 on the circumference thereof. As in the case of the wall-shaped protrusions 30', the wall-shaped protrusions may not necessarily surround all the rim of the dial 60. The cut 37 provided at a position which does not correspond to any of the jig-side uneven portions allows an operator to easily remove the dial 60 from the jig sheet.

In the positioning parts 20" of the jig sheet 2" shown in FIG. 5(B), underlying prints (markings) 13 respectively corresponding to the prints to be made on the dials 60 are printed in advance at the respective positions where the dials 60 are to be placed. The jig sheet may not be necessarily plain. In general, since the shapes and sizes of the dials 60 are different between products, in particular, if different colors and designs are printed (based on different printing specifications) on multiple dials 60 at the same time, it is preferred to provide the jig sheet with the underlying prints 13 which are the same as the prints on the finished dials 60. Further, for example, if multiple kinds of dials 60 which differ in outer shape or in color are placed on the jig sheet, it is also preferred to similarly provide the underlying prints 13. Then, an operator can easily understand where to place each dial 60, and can be prevented from erroneously placing the dials 60 at incorrect positions, which improves the accuracy of work for placing the dials 60 on the jig sheet and its workability.

Figure 6A:
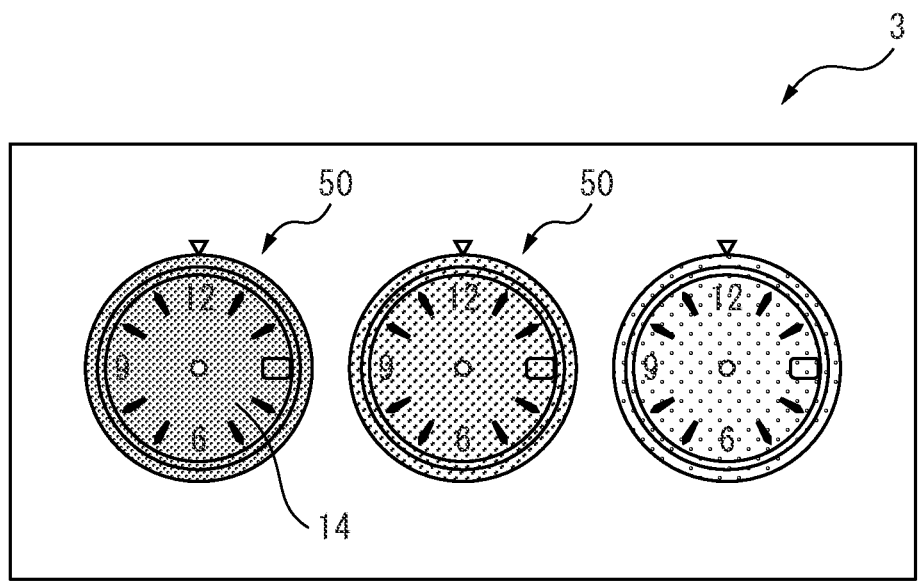
FIGS. 6(A) and 6(B) are plan views of a jig sheet 3.
Figure 6B:
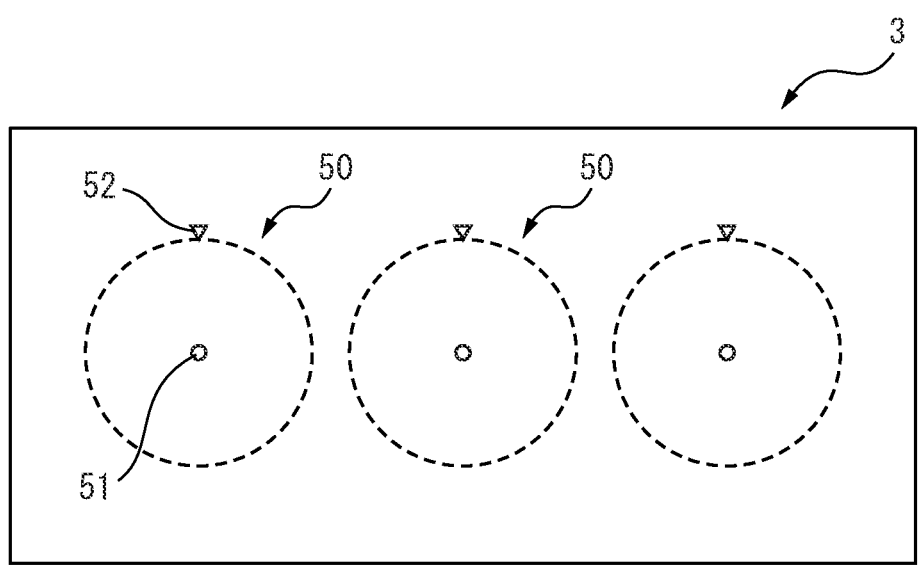

FIGS. 6(A) and 6(B) are plan views of a jig sheet 3. The jig sheet 3 is also a sheet-shaped member which supports the dials (objects to be printed) and is placed on the mounting surface 10 of the jig plate 1 in FIG. 1(A), similarly to the jig sheet 2. However, the jig sheet 3 differs from the jig sheet 2 in shape of the positioning parts for positioning the dials and in that underlying prints 14 are printed in advance on the jig sheet 3 at positions where the dials are to be placed. The underlying prints 14 have the same colors and designs as (or similar colors and designs to) the prints to be made on the dials 60 placed at the respective positions, for example. The printing jig may be composed of the jig plate 1 and the jig sheet 3.

On the jig sheet 3, multiple dials can be placed side by side. FIG. 6(A) shows an example where three positioning parts 50 are provided so that three dials can be placed. In the case of the jig sheet 3 also, the underlying prints 14 allow an operator to easily understand where to place each dial 60, which improves the accuracy of work for placing the dials on the jig sheet and its workability.

In FIG. 6(B), in order to show the structure of the positioning parts 50 of the jig sheet 3 plainly, the underlying prints 14 are omitted from illustration, and the positions on the jig sheet 3 where the dials are to be placed are indicated by broken lines. Each positioning part 50 is composed of a center protrusion 51 and an outer protrusion 52.

FIGS. 7(A) to 7(E) are enlarged views of one of the positioning parts 50 and a dial 70, and diagrams for illustrating how to fix the dial 70 to the positioning part 50.

The dial (dial substrate) 70 is a substantially circular flat-shaped (disc-shaped) member having a diameter of several centimeters and a thickness of several hundreds of micrometers, for example. In the example shown in FIG. 7(A), the dial 70 includes six uneven portions on the side surface (lateral side) thereof, and an opening (center hole 77 through which a hand shaft passes) at the center thereof. Hereinafter, these uneven portions will be referred to as uneven portions 71 to 76 in clockwise order from the one placed at the 12 o'clock position of the dial 70. In particular, the uneven portion 71 is a recess (cut or notch) formed at the 12 o'clock position of the rim of the dial 70. This recess is used as a reference for positioning the dial in the process of conventional pad printing or screen printing, and has strictly controlled dimensions.

FIG. 7(D) is an enlarged view of the center protrusion 51. The center protrusion 51 has a hemispherical shape, and is placed so as to be brought into contact with the inner wall of the center hole 77 of the dial 70. The positioning parts of the jig sheet may be brought into contact not only with the lateral side on the rim of the dial, but also with the inner wall of an opening thereof, as in the case of the center protrusion 51. The hemispherical center protrusion 51 has the advantage that an operator can easily attach dials 70 to the jig sheet 3, since the hemispherical surface serves as a guiding surface.

FIG. 7(E) is an enlarged view of the outer protrusion 52. The outer protrusion 52 has a triangular prism shape, as an example, and is formed so that it is fitted into the recess (cut or notch) of the uneven portion 71 of the dial 70 placed on the upper surface (mounting surface) of the jig sheet 3 and thereby brought into contact with the rim of the dial 70 at the uneven portion 71. It is preferred that the height (thickness) of the printed center protrusion 51 and outer protrusion 52 constituting the positioning part 50 be as much as that of the dial 70, similarly to the positioning parts 20.

As shown in FIGS. 7(B) and 7(C), in order to fix the dial 70 to the positioning part 50, it is sufficient to fit the center protrusion 51 and the outer protrusion 52 into the center hole 77 and the uneven portion 71 of the dial 70, respectively. In the case of the jig sheet 3 also, since an operator only needs to put dials 70 on the jig sheet 3 as if to put pieces of a puzzle together, the dials 70 can be easily positioned and fixed. Since each positioning part 50 is composed of only the center protrusion 51 and the outer protrusion 52, the positioning parts 50 are simpler in structure than the positioning parts 20 of the jig sheet 2, and can position and fix the dial 70 with smaller projections.

The jig sheet 3 can be used for printing on the front and rear surfaces of the dials, unlike the jig sheet 2. Which of the jig sheets 2 and 3 to use can be appropriately chosen based on the outer shapes of dials and other factors.

Instead of the center hole 77, an opening through which a small hand shaft passes or a window for showing a calendar may be used for positioning the dial 70. In this case, a protrusion may be formed at a position on the jig sheet 3 where it is brought into contact with the inner wall of such an opening or a window when the dial 70 is placed. Then, the dial 70 can be positioned by this protrusion.

Figure 8A:
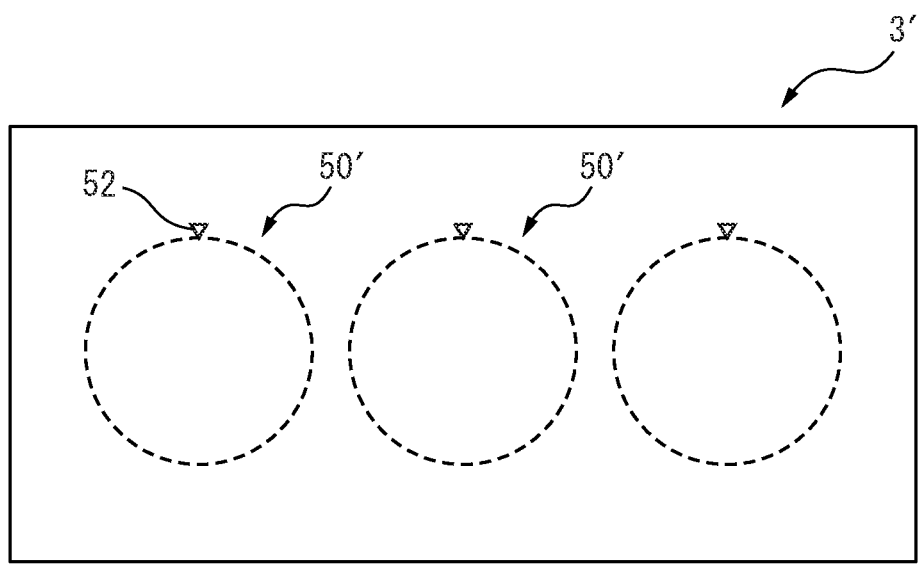
FIGS. 8(A) and 8(B) are plan views of jig sheets 3' and 3".
Figure 8B:
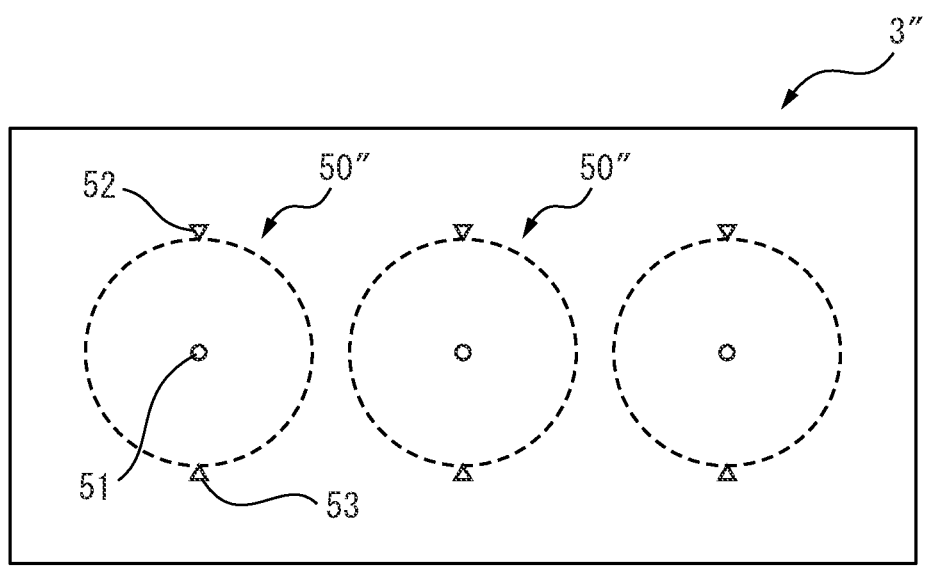

FIGS. 8(A) and 8(B) are plan views of jig sheets 3' and 3", respectively. Each of the positioning parts 50' of the jig sheet 3' shown in FIG. 8(A) includes only an outer protrusion 52, and does not include a center protrusion 51. Depending on the types of the dials to be printed or the inkjet-type printer to be used, the positioning parts may not necessarily include a center protrusion, as in the case of the positioning parts 50', if each dial can be securely positioned and fixed only by the outer protrusion. Each of the positioning parts 50" of the jig sheet 3" shown in FIG. 8(B) includes, in addition to the same center protrusion 51 and outer protrusion 52 as those in the positioning parts 50, an outer protrusion 53 formed on the side opposite to the outer protrusion 52 with respect to the center protrusion 51. Each dial can be more securely positioned and fixed by several outer protrusions contacting the dial at several points on the rim thereof, as in the case of the positioning parts 50".

Instead of the outer protrusions 52 and 53, for example, other outer protrusions may be formed at two positions on the jig sheet 3 where they are brought into contact with two portions of the side surface of the uneven portion 71 on the 3 o'clock and 9 o'clock sides when the dial 70 is placed. Then, the dial 70 can be fixed by the uneven portion 71 sandwiched between these outer protrusions.

FIGS. 9(A) to 9(E) are conceptual diagrams for illustrating how to print on the dials 60. With reference to these figures, a description will be given below of an example of the method for manufacturing printed objects (dials) in which the jig sheet 2 is used. The same applies to the cases where the jig sheet 2', 2", 3, 3' or 3" is used.

In order to print on dials, the operator first positions the jig sheet 2 of FIG. 2 on the jig plate 1 of FIG. 1(A), and places them in an inkjet-type printer 100, as shown in FIG. 9(A). The printer 100 is a UV digital inkjet-type printer, for example, which represents various colors based on combinations of four colors of YMCK, thereby performing color printing.

Then, the operator operates the printer 100 to form the positioning parts 20 (wall-shaped protrusions 30 and 40) by inkjet printing on the upper surface (mounting surface for dials) of the jig sheet 2, as shown in FIG. 9(B). The wall-shaped protrusions 30 and 40 are formed by repeatedly printing on the same areas of the jig sheet 2. At this time, it is not necessary to make every print in the same color. A color ink may be used for only the first printing, and a transparent ink for the second and subsequent printing. Due to the difference in viscosity between inks, three-dimensional printing can be easily achieved by using a transparent ink.

Subsequently, the operator draws out the jig plate 1 and the jig sheet 2 from the printer 100, and fits unprinted dials 60 into the wall-shaped protrusions 30 on the jig sheet 2, thereby positioning and fixing the dials 60 relative to the wall-shaped protrusions 30, as shown in FIG. 9(C). At this time, the dials 60 are placed on the upper surface (mounting surface) of the jig sheet 2 so that the uneven portions 61 to 66 of the lateral side of each dial 60 comes into contact with the jig-side uneven portions 31 to 36 of the corresponding wall-shaped protrusion 30.

Next, the operator positions the jig sheet 2, on which the dials 60 are arranged, on the jig plate 1 again, and places them in the printer 100, as shown in FIG. 9(D). Then, the operator operates the printer 100 to perform inkjet printing on the dials 60. This completes printing on the dials 60, as shown in FIG. 9(E).

If the positioning parts 20 are directly formed on the jig plate 1 without using the jig sheet 2, the step of FIG. 9(A), i.e., the step of positioning the jig sheet 2 of FIG. 2 on the jig plate 1 of FIG. 1 is omitted, and in FIG. 9(C), unprinted dials 60 are directly placed on the jig plate 1 on which the positioning parts 20 are formed.

In the steps of printing on the dials (FIG. 9(E)) and forming the positioning parts 20 (FIG. 9(B)), different inkjet-type printers may be used, but the same printer 100 is preferably used. The use of the same printer 100 in both steps can reduce print misalignment to about 10 or less, for example, because it reduces displacements between the positioning parts 20 and the prints on the dials.

If printing on dials are repeated based on the same printing specifications, the jig sheet 2 having the positioning parts 20 formed thereon in the step shown in FIG. 9(B) can be repeatedly used in the step of FIG. 9(C) and thereafter. In other words, the steps of FIGS. 9(A) and 9(B) are first performed, and then the steps of FIGS. 9(C) to 9(E) can be repeated.

All of the above-described jig sheets 2, 3, etc., can be easily produced by inkjet printing. With the jig sheets 2, 3, etc., one can print on dials while making the best use of the advantage of inkjet printing.

Figure 10:
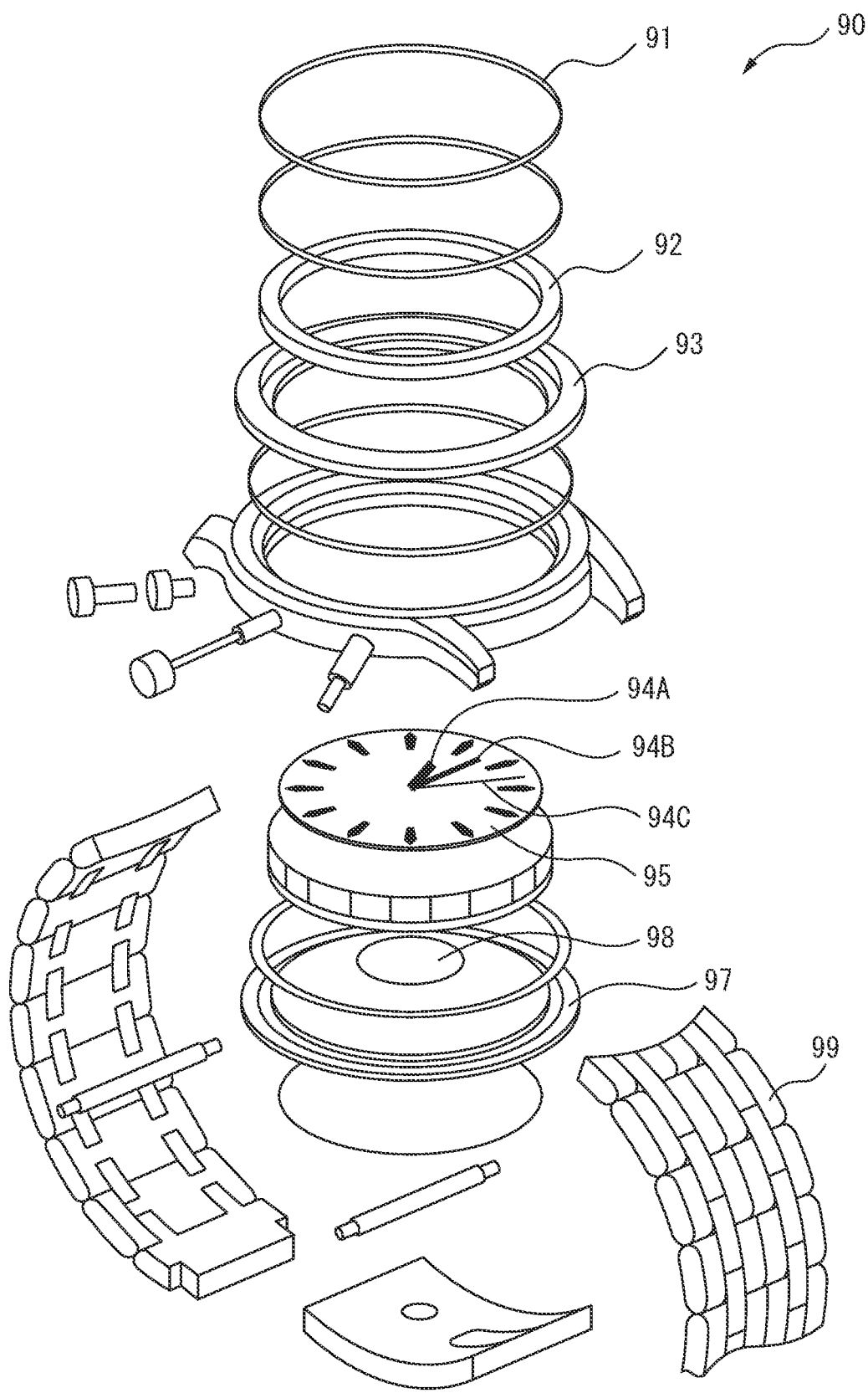
FIG. 10 is an exploded perspective view of a wrist watch 90.

FIG. 10 is an exploded perspective view of a wrist watch 90. Timepiece components (objects to be printed) to which the above printing jigs are applicable include, in addition to the dial (dial 95), a protective glass 91, a dial ring 92, a bezel 93 (ring-shaped component around the protective glass 91), hands (an hour hand 94A, a minute hand 94B and a second hand 94C), a reflective plate (not shown), a case back 97, a sticker 98 on the inside of the case back, and a band 99, for example, which are shown in FIG. 10. The reflective plate is a semitransparent member laid on the lower surface of the dial for the purpose of providing a metallic appearance, and transmits light to a solar cell of the timepiece disposed under the dial. The above printing jigs for inkjet printing facilitate full-color printing on such a reflective plate.

In the jig sheets 2, 2', 2", 3, 3' and 3" shown in FIGS. 2 to 8(B), the jig-side uneven portions 32 and 35 or the outer protrusions 52 and 53, which are formed so as to match the portions of the dials 60 and 70 having strictly controlled dimensions, are used for positioning and fixing the dials 60 and 70. However, depending on the tolerable limits of print misalignment, other jig-side uneven portions or outer protrusions formed so as to match portions of the lateral side of each dial whose dimensions are not strictly controlled may be used for positioning and fixing the dials 60 and 70.

The jig sheets 2, 2', 2", 3, 3' and 3" or the jig plate 1 may be formed from a material having weaker intermolecular force than the ink used for forming the positioning parts 20, 50, 50' and 50". Thereby, the positioning parts 20, 50, 50' and 50" can be peeled off with a plastic spatula without damaging the mounting surface. For example, if the ink contains an acrylic resin, the jig sheets 2, 2', 2", 3, 3' and 3" or the jig plate 1 may be formed from a polyacetal resin, aluminum, stainless steel, or a metal such as copper. On the jig sheet 2, 2', 2", 3, 3' and 3" or the jig plate 1 from which the positioning parts are peeled off, other positioning parts 20, 50, 50' or 50" can be formed again. In other words, the jig sheet 2, 2', 2", 3, 3' and 3" or the jig plate 1 can be repeatedly provided with the positioning parts 20, 50, 50' and 50", and reused.

Figure 11A:
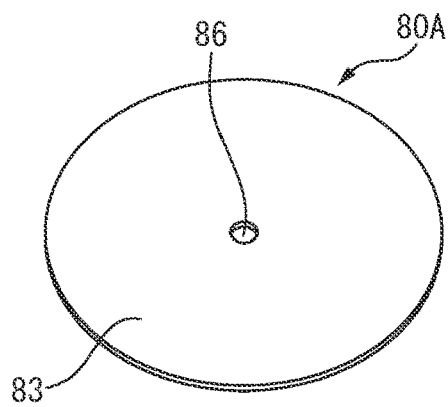
FIGS. 11(A) to 11(F) are diagrams for explaining a positioning part 50A for a dial 80A.
Figure 11B:
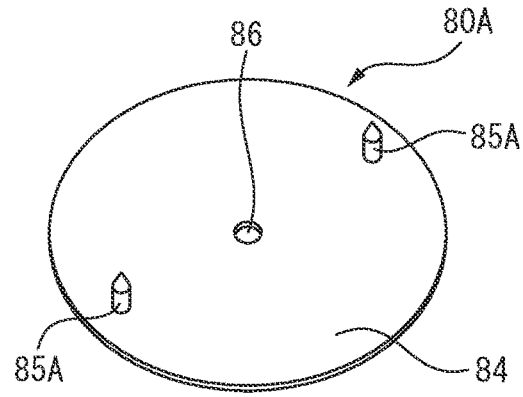

FIGS. 11(A) to 11(F) are diagrams for explaining a positioning part 50A for a dial 80A. Of these, FIGS. 11(A) and 11(B) are perspective views showing the front surface 83 and the rear surface 84 of a dial 80A, respectively. The dial 80A is an unprinted dial substrate (object to be printed), and is made of a metallic material. The dial 80A includes a center hole 86 through which a hand shaft passes, and two projections (legs) 85A for fixing the dial to the movement of a timepiece, on the rear surface 84 at two ends sandwiching the center hole 86. However, the dial 80A does not include uneven portions on the side surface thereof, unlike the dials 60 and 70.

Figure 11C:
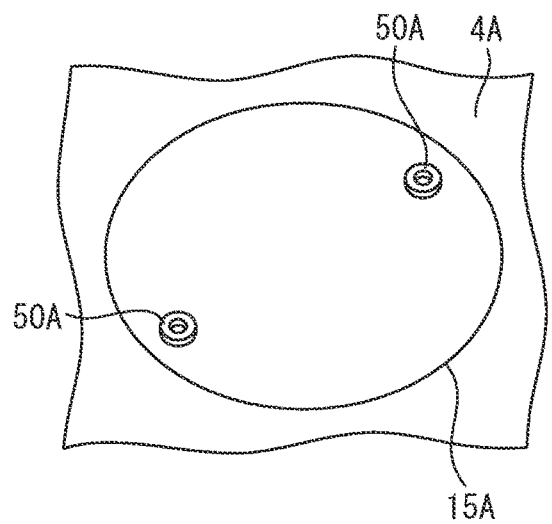
Figure 11D:
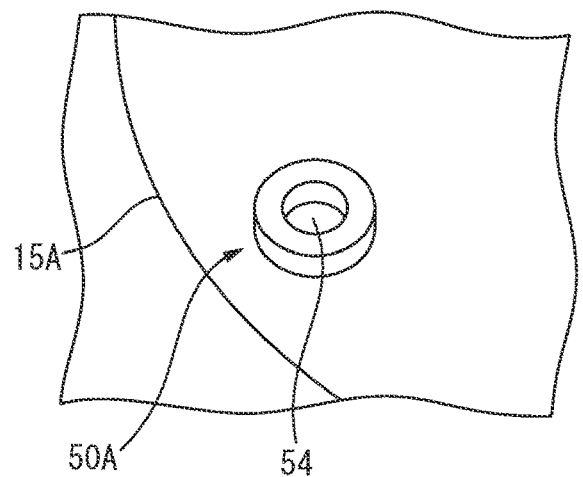

FIG. 11(C) is an enlarged view showing a positioning part 50A on a jig sheet 4A for the dial 80A. The jig sheet 4A is a member placed on the mounting surface 10 of the jig plate 1 of FIG. 1(A), and includes multiple positioning parts 50A and underlying prints 15A corresponding to multiple dials 80A; however, FIG. 11(C) shows only one of the positioning parts 50A and one of the underlying prints 15A. Each underlying print 15A is, for example, a curve indicating the dial 80A in outline, or the same print as on the finished dial 80A, and is provided for clearly indicating where to place the dial 80A to an operator.

Figure 11E:
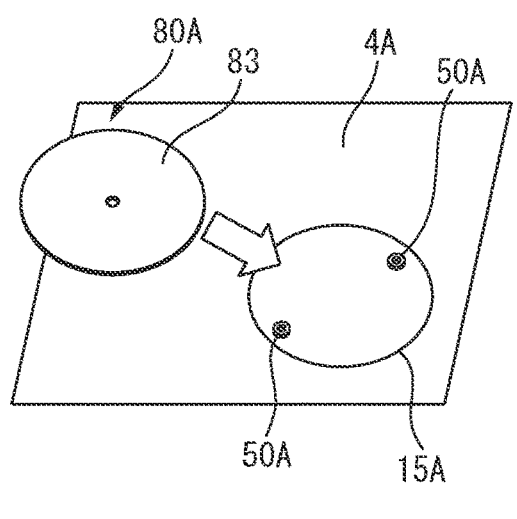
Figure 11F:
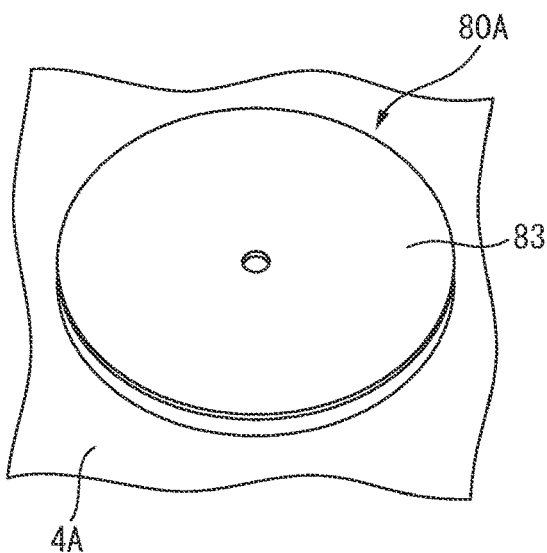

Each positioning part 50A is composed of two cylindrical protrusions formed by inkjet printing. These protrusions correspond to the projections 85A of the dial 80A, and each include a recess 54 as shown in enlarged form in FIG. 11(D). The distance between the protrusions of the positioning part 50A coincides with the distance between the two projections 85A on the dial 80A, and the inner diameter of the recesses 54 coincides with the outer diameter of the projections 85A. In other words, the positioning part 50A is placed so as to be brought into contact with the projections 85A of the dial 80A; and the projections 85A are fitted into the recesses 54 when the dial 80A is placed on the jig sheet 4A, as shown in FIGS. 11(E) and 11(F). The positioning parts 50A allow for easily positioning and fixing the dials 80A on the jig sheet 4A. Thus, the printing jigs including the positioning parts formed by inkjet printing are effective in printing not only on timepiece components having projections on the lateral side thereof, but also on those components, such as metal dials, which have projections on the bottoms thereof.

Figure 12:
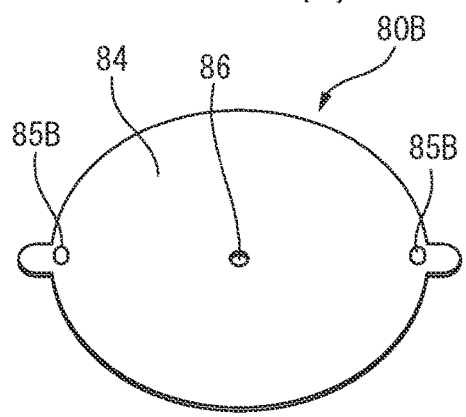
FIGS. 12(A) to 12(F) are diagrams for explaining a positioning part 50B for a dial 80B.
Figure 12:
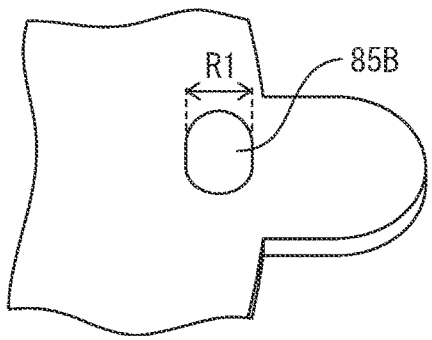
Figure 12:
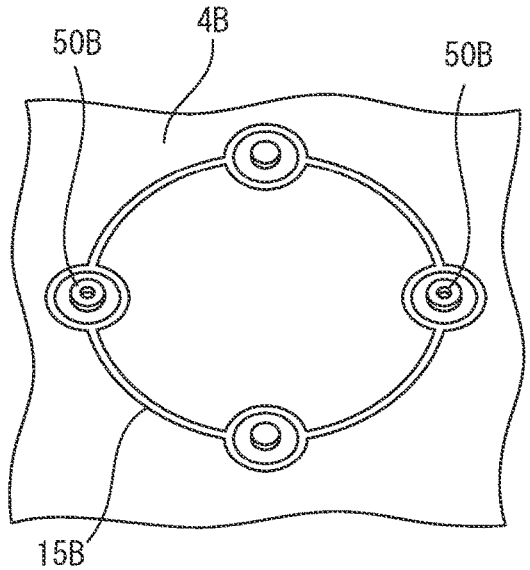
Figure 12:
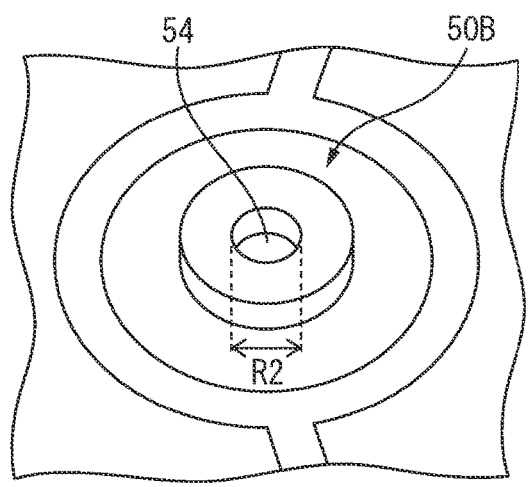
Figure 12:
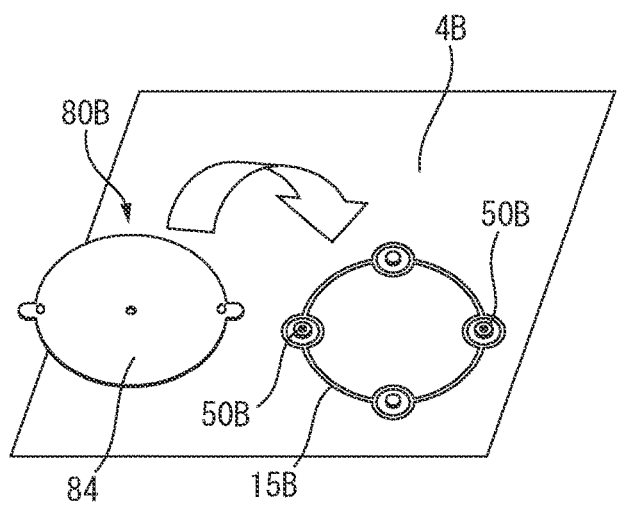
Figure 12:
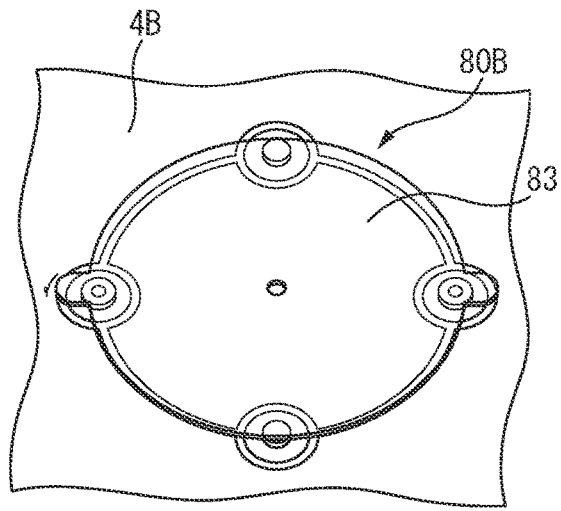

FIGS. 12(A) to 12(F) are diagrams for explaining a positioning part 50B for a dial 80B. Of these, FIG. 12(A) is a perspective view showing the rear surface 84 of a dial 80B, and FIG. 12(B) is a partial enlarged view of FIG. 12(A). The dial 80B is a plastic transparent dial substrate (object to be printed), which is different from the dial 80A, and includes a center hole 86 and two projections 85B on the rear surface 84, similarly to the dial 80A. FIG. 12(C) is an enlarged view showing a positioning part 50B on a jig sheet 4B for the dial 80B, and FIG. 12(D) is a partial enlarged view of FIG. 12(C). The jig sheet 4B is also provided with an underlying print 15B for indicating where to place the dial 80B. The positioning part 50B is composed of two cylindrical protrusions formed by inkjet printing, and each protrusion includes a recess 54, similarly to the positioning part 50A.

In the positioning part 50B, an extra space (play) is provided for each recess 54 within the tolerable limits of dimensions, in order to facilitate the attachment and removal of the dial 80B, and thus the inner diameter R2 of the recesses 54 is slightly larger than the outer diameter R1 of the projections 85B. As shown in FIGS. 12(E) and 12(F), the dial 80B can be easily positioned and fixed on the jig sheet 4B by fitting the projections 85B on the rear surface 84 of the dial 80B into the recesses 54.

Figure 13A:
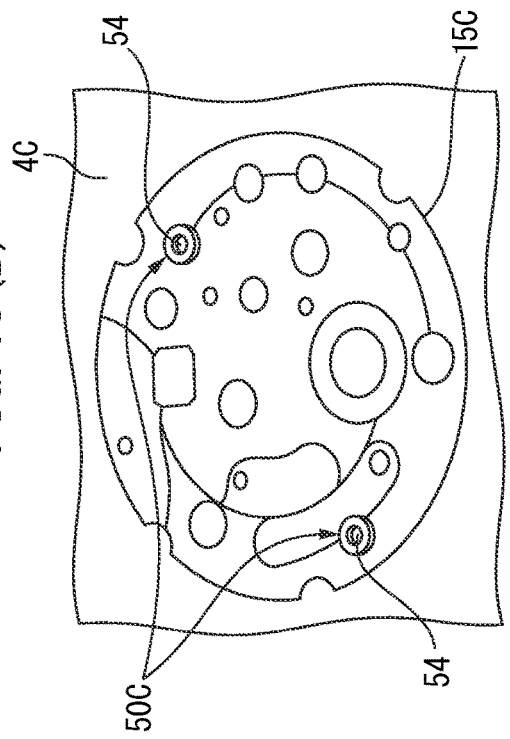
FIGS. 13(A) to 13(D) are diagrams for explaining a positioning part 50C for a main plate 80C.
Figure 13B:
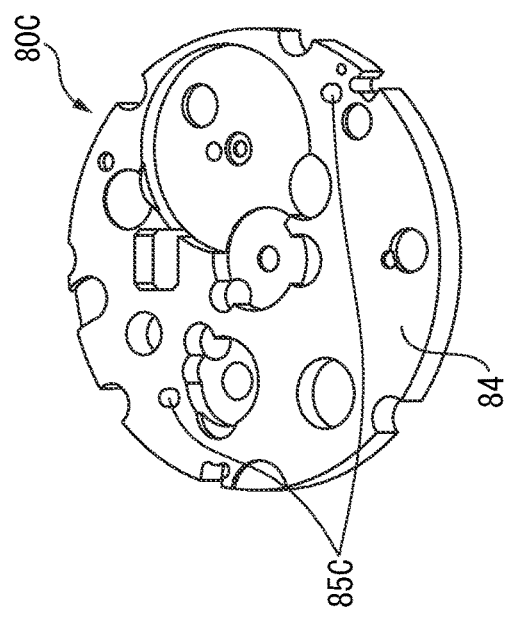
Figure 13C:
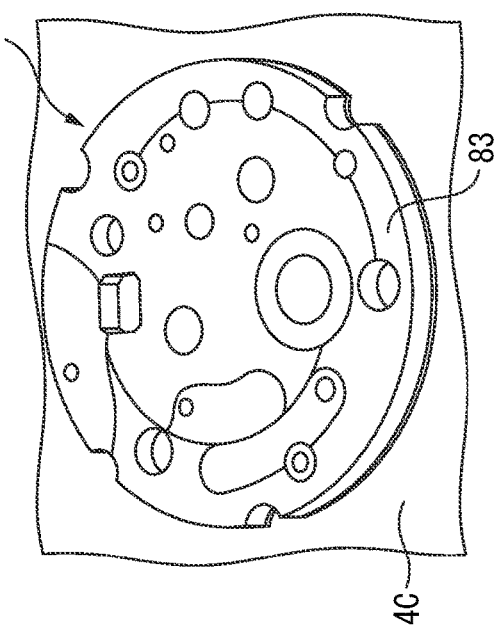
Figure 13D:
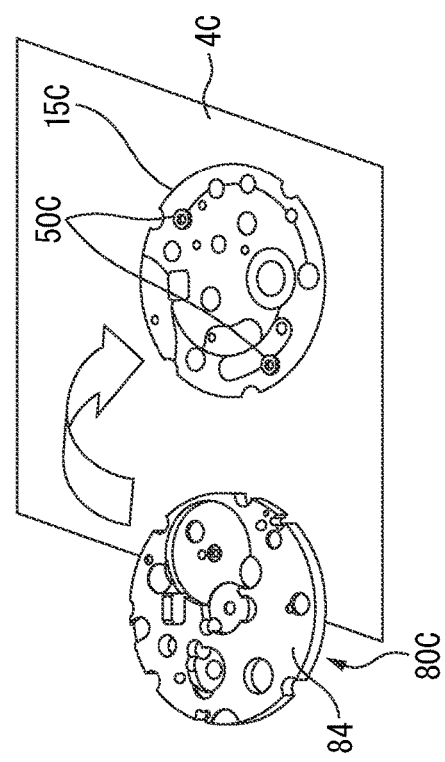

FIGS. 13(A) to 13(D) are diagrams for explaining a positioning part 50C for a main plate 80C. Of these, FIG. 13(A) is a perspective view showing the rear surface 84 of a main plate 80C of a wrist watch, and FIG. 13(B) is an enlarged view showing a positioning part 50C on a jig sheet 4C for the main plate 80C. The main plate 80C includes two projections 85C on the rear surface 84, similarly to the dials 80A and 80B. The objects to be printed are not limited those described above, and may be a component of a movement, or another timepiece component such as a main plate. The positioning part 50C is also composed of two cylindrical protrusions formed by inkjet printing, and each protrusion includes a recess 54. The jig sheet 4C is provided with an underlying print 15C having the same pattern as the finished main plate 80C. As shown in FIGS. 13(C) and 13(D), the main plate 80C can be easily positioned and fixed on the jig sheet 4C by fitting the projections 85C on the rear surface 84 of the main plate 80C into the recesses 54.

Figure 14B:
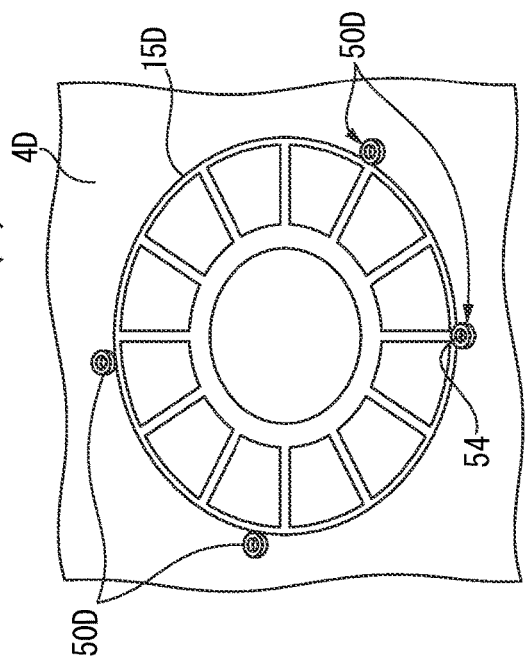
FIGS. 14(A) to 14(D) are diagrams for explaining a positioning part 50D for a dial ring 80D.
Figure 14A:
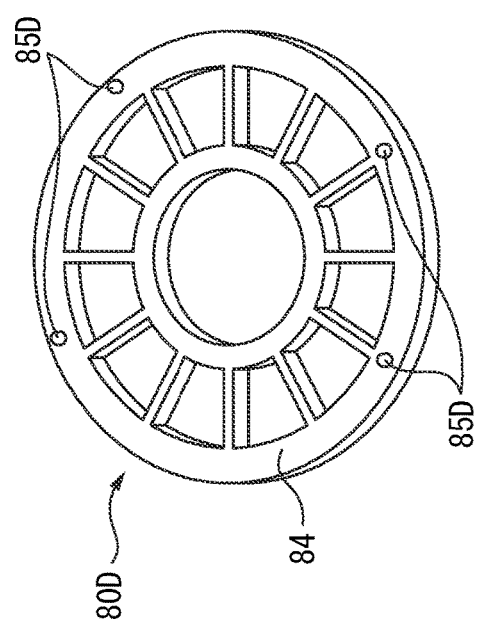

FIGS. 14(A) to 14(D) are diagrams for explaining a positioning part 50D for a dial ring 80D. Of these, FIG. 14(A) is a perspective view showing the rear surface 84 of a dial ring 80D. The dial ring 80D (object to be printed) is composed of two concentrically arranged annular portions, and twelve straight connecting portions which are evenly spaced in the circumferential direction and connect the two annular portions, and includes four projections 85D on the rear surface 84 of the outer annular portion.

Figure 14D:
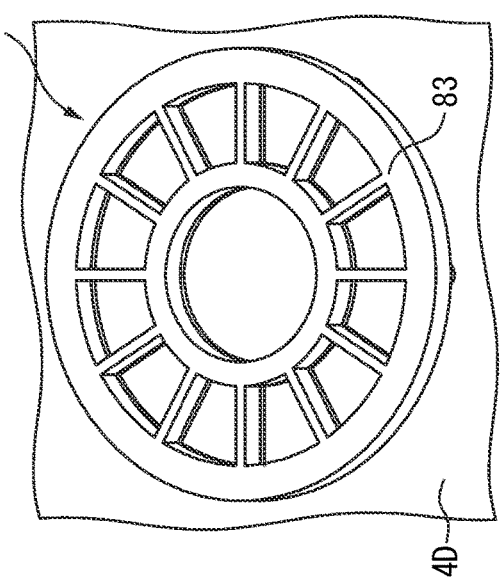
Figure 14C:
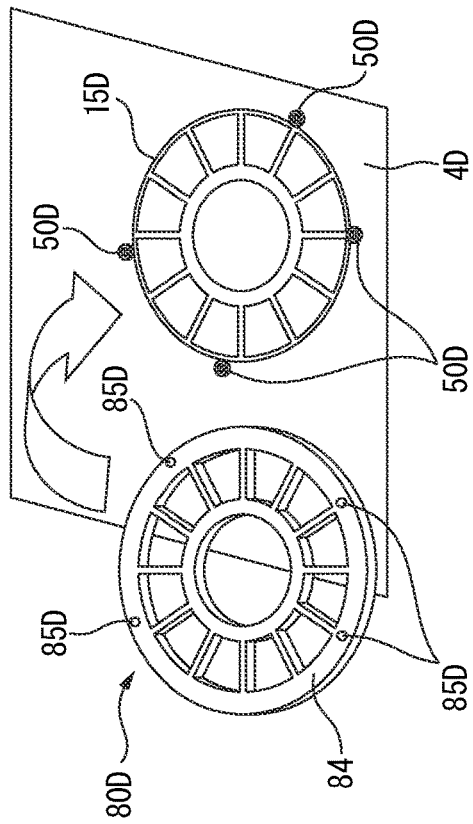

FIG. 14(B) is an enlarged view showing a positioning part 50D on a jig sheet 4D for the dial ring 80D. The positioning part 50D is composed of four cylindrical protrusions which are formed by inkjet printing and arranged so as to have the same positional relationship with the projections 85D of the dial ring 80D, and each protrusion includes a recess 54. The jig sheet 4D is also provided with an underlying print 15D having the same pattern as the finished jig sheet 4D. As shown in FIGS. 14(C) and 14(D), the dial ring 80D can be easily positioned and fixed on the jig sheet 4D by fitting the projections 85D on the rear surface 84 of the dial ring 80D into the recesses 54. Printing on an uneven surface, such as the surface of the dial ring 80D, is not successfully performed by screen printing and silk printing, but can be achieved by inkjet printing. The printing jigs including the positioning parts formed by inkjet printing are also effective in printing on such a timepiece component.

Figure 15:
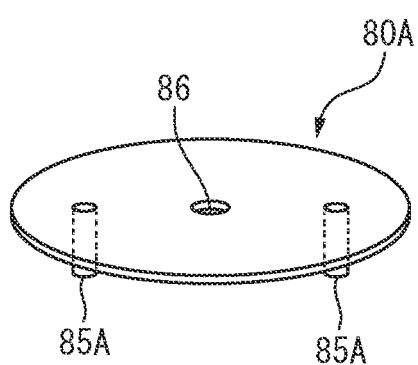
FIGS. 15(A) to 15(E) are diagrams for explaining another positioning part 50E for the dial 80A and a dial ring 80E.
Figure 15:
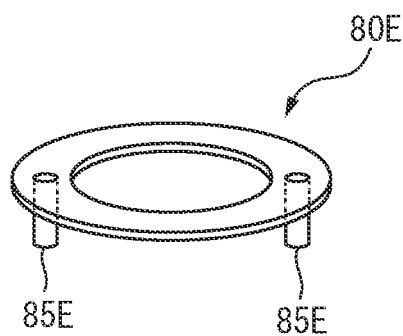
Figure 15:
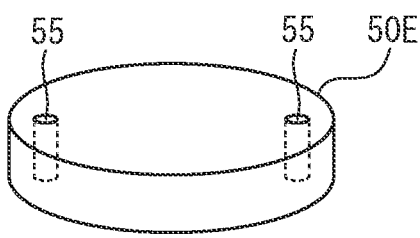
Figure 15:
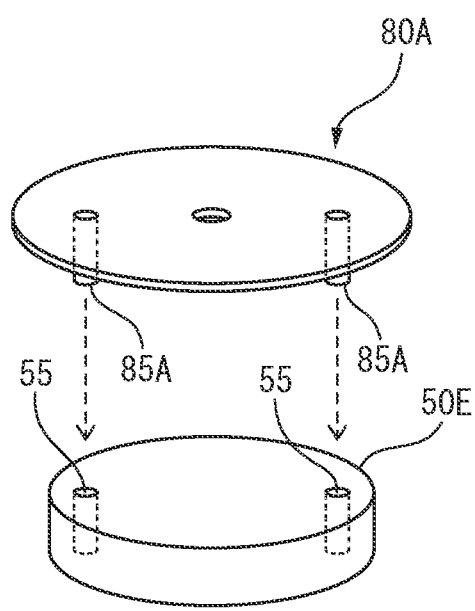
Figure 15:
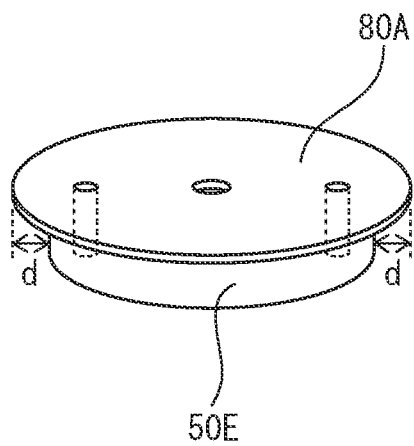

FIGS. 15(A) to 15(E) are diagrams for explaining another positioning part 50E for the dial 80A and a dial ring 80E. Of these, FIGS. 15(A) and 15(B) are perspective views of the above-described dial 80A, and an annular dial ring 80E including two projections 85E on the rear surface thereof, respectively. FIG. 15(C) is an enlarged view showing a positioning part 50E on a jig sheet for the dial 80A and the dial ring 80E. FIGS. 15(D) and 15(E) are perspective views showing how to attach the dial 80A to the positioning part 50E.

The positioning part 50E is formed by inkjet printing, but is composed of one cylindrical protrusion, unlike the positioning parts 50A to 50D, and includes two recesses 55 corresponding to the projections 85A of the dial 80A and the projections 85E of the dial ring 80E. As in the case of the positioning part 50E, the number of protrusions forming a positioning part may not be necessarily the same as that of projections of an object to be printed. As shown in FIG. 15(E), the diameter of the positioning part 50E is smaller by a length of 2d than that of the dial 80A (or the dial ring 80E). As described above, it is preferred that the outer diameter of the protrusion of the positioning part be smaller than that of the object to be printed so as to facilitate the attachment and removal of each object to and from the positioning part.

Figure 16A:
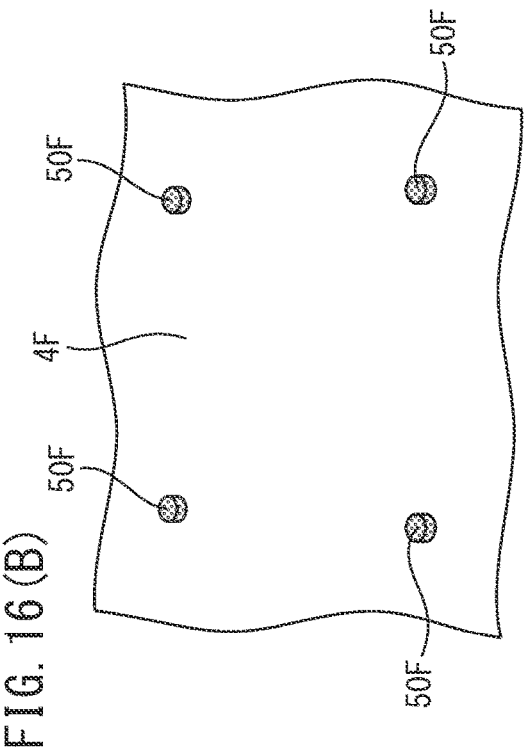
FIGS. 16(A) to 16(D) are diagrams for explaining a positioning part 50F for a dial 80F.
Figure 16B:
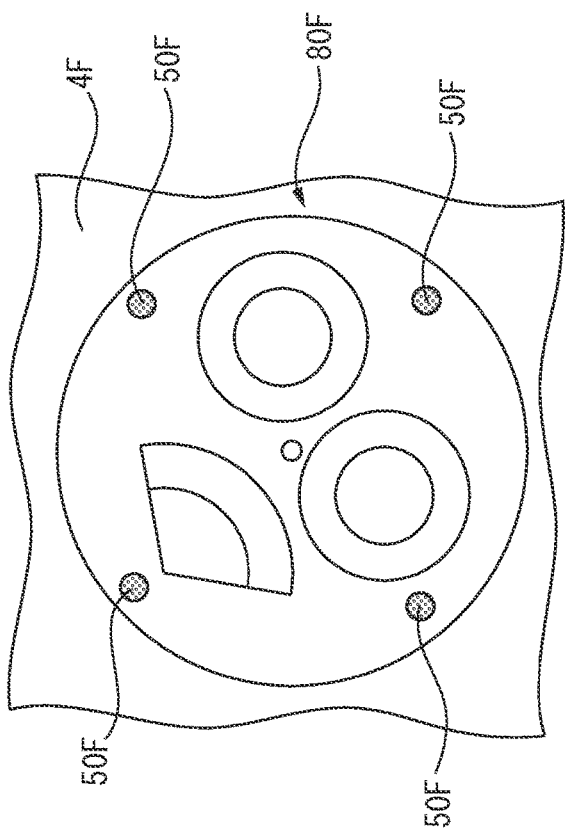
Figure 16C:
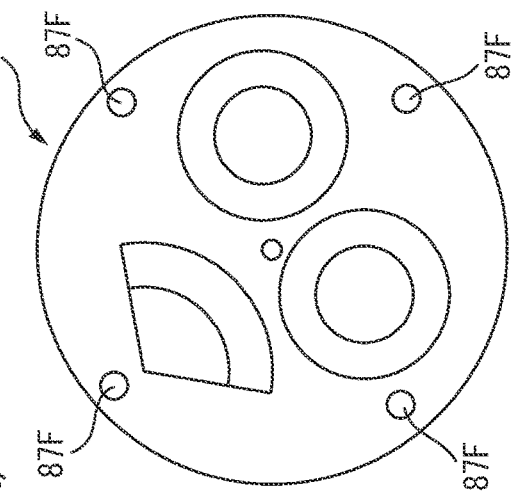
Figure 16D:
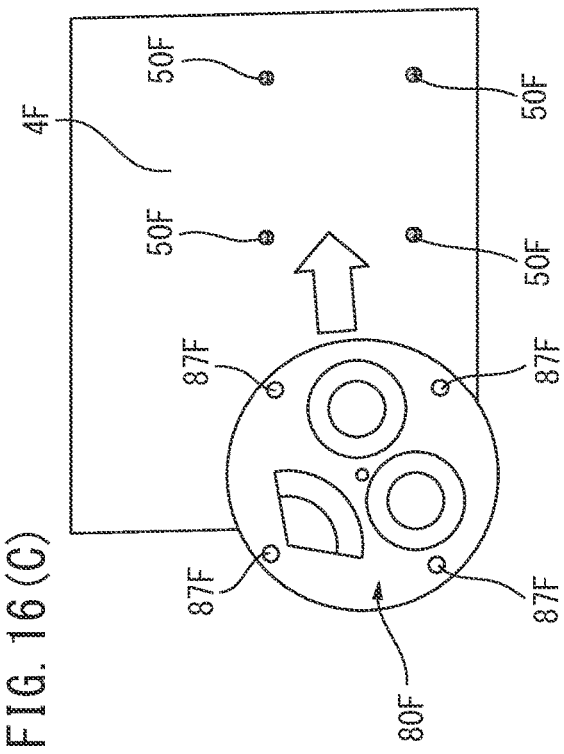

FIGS. 16(A) to 16(D) are diagrams for explaining a positioning part 50F for a dial 80F. Of these, FIG. 16(A) is a top view of a dial 80F (object to be printed) including four openings 87F, and FIG. 16(B) is an enlarged view showing a positioning part 50F on a jig sheet 4F for the dial 80F. The positioning part 50F is composed of four cylindrical protrusions formed by inkjet printing so as to have the same positional relationship with the openings 87F of the dial 80F. As shown in FIGS. 16(C) and 16(D), the protrusions of the positioning part 50F are brought into contact with the inner walls of the openings 87F by fitting the positioning part 50F into the openings 87F of the dial 80F, which causes the dial 80F to be positioned and fixed on the jig sheet 4F.

Figure 17A:
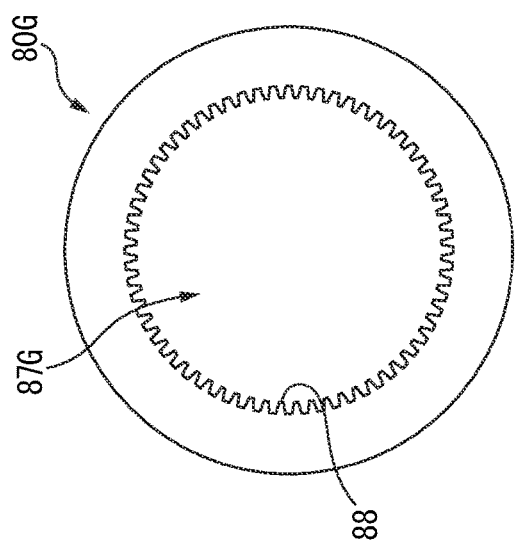
FIGS. 17(A) to 17(D) are diagrams for explaining a positioning part 50G for a date dial 80G.
Figure 17B:
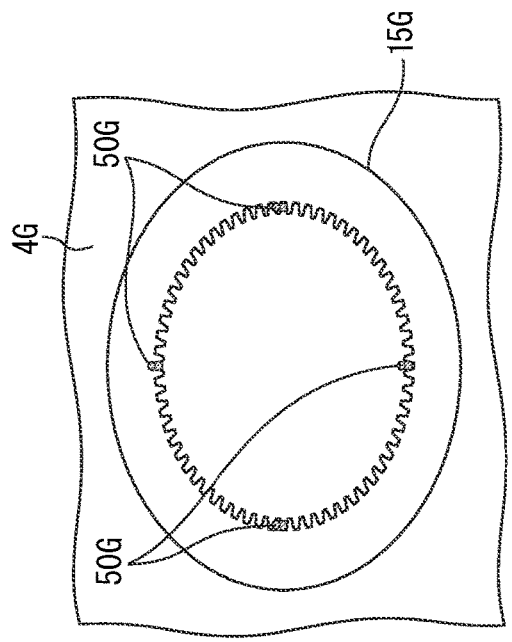
Figure 17C:
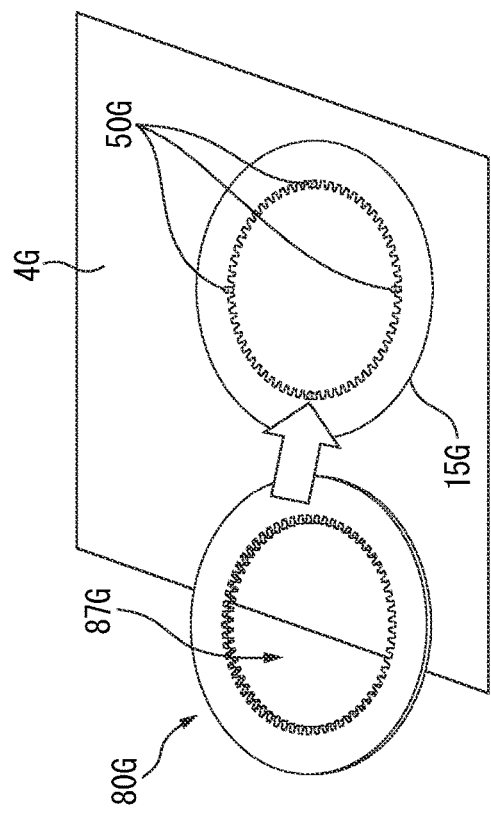
Figure 17D:
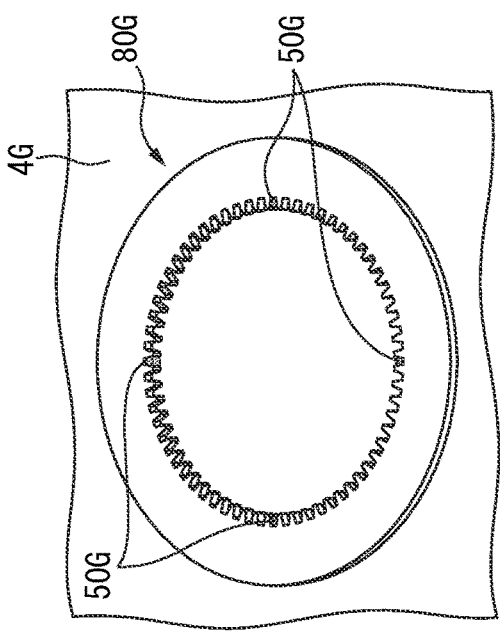

FIGS. 17(A) to 17(D) are diagrams for explaining a positioning part 50G for a date dial 80G. Of these, FIG. 17(A) is a top view of an annular date dial 80G (object to be printed) having an opening 87G whose inner wall 88 has gear teeth, at the center thereof. FIG. 17(B) is an enlarged view showing a positioning part 50G on a jig sheet 4G for the date dial 80G. The positioning part 50G is composed of four protrusions formed by inkjet printing so as to be arranged on the same circumference as the inner wall 88 of the opening 87G of the date dial 80G. The jig sheet 4G is also provided with an underlying print 15G for indicating the correct position where the date dial 80G is to be placed, so as to be aligned with the correct position. As shown in FIGS. 17(C) and 17(D), the date dial 80G is placed on the jig sheet 4G so that the four protrusions are included in the opening 87G of the date dial 80G, thereby causing the protrusions of the positioning part 50G to be brought into contact with the inner wall 88 of the date dial 80G, which causes the date dial 80G to be positioned and fixed.

Figure 18A:
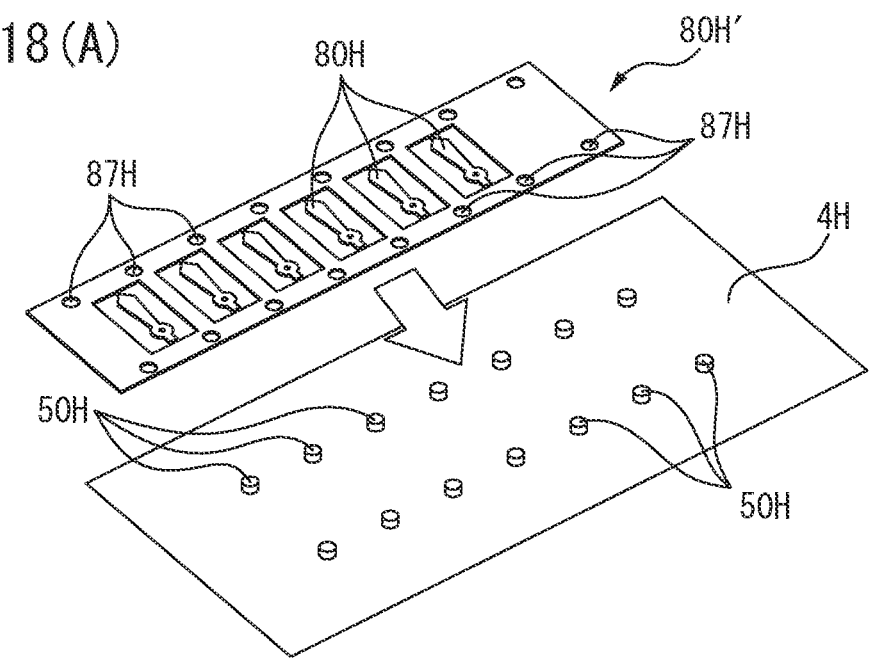
FIGS. 18(A) to 18(C) are diagrams for explaining a positioning part 50H for a component array 80H'.
Figure 18B:
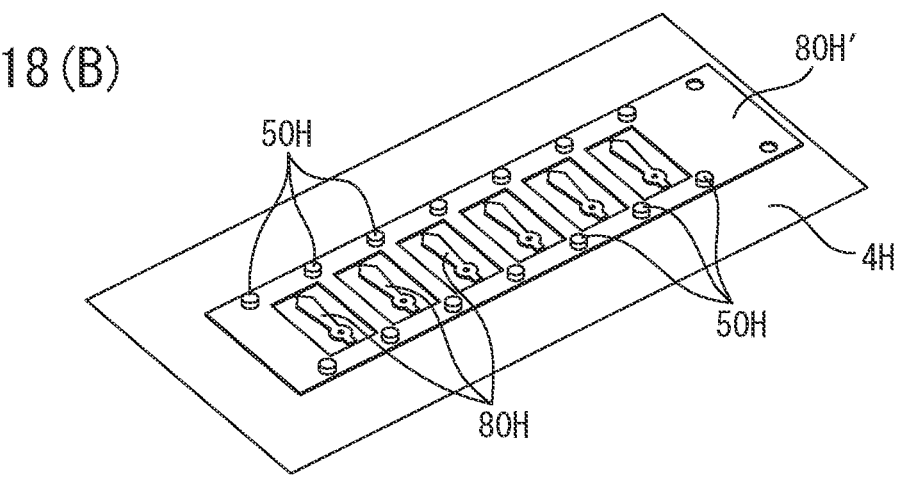
Figure 18C:
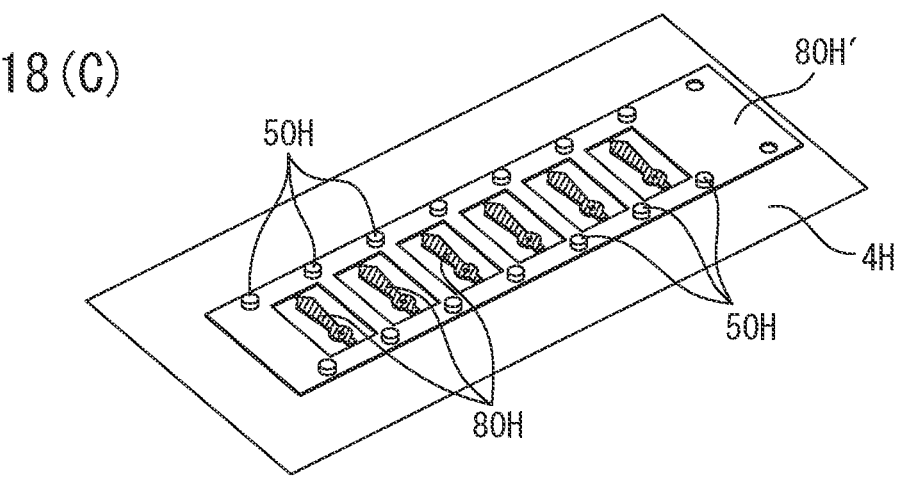

FIGS. 18(A) to 18(C) are diagrams for explaining a positioning part 50H for a component array 80H'. The component array 80H' shown in FIG. 18(A) is a member used during the manufacture of hands of timepieces, and is formed by punching a substrate so as to include multiple connected components 80H which will become hands. The component array 80H' is provided with multiple openings 87H along the two long sides of the rectangular substrate. FIG. 18(A) also shows a jig sheet 4H for the component array 80H'. The jig sheet 4H is provided with multiple protrusions, as a positioning part 50H, which are formed by inkjet printing so as to have the same positional relationship with the openings 87H of the component array 80H'.

As shown in FIG. 18(B), the protrusions of the positioning part 50H are fitted into the openings 87H of the component array 80H', thereby causing the component array 80H' to be positioned and fixed on the jig sheet 4H. In this state, as shown in FIG. 18(C), the components 80H are correctively subjected to printing. Thus, the printing jigs including the positioning parts formed by inkjet printing are also effective in corrective printing on objects in a component array.

All of the protrusions in the positioning parts 20, 30 and 50A to 50H are made of deposited and cured ink used by an inkjet-type printer. The inkjet-type printer herein includes, in addition to inkjet printers, 3-D printers which eject ink based on the same principle as inkjet printers and cure the ink by UV irradiation.

Although the description has been given in the above embodiments by dealing with the examples where the indicator panel is a dial for a timepiece, the above jig plate and jig sheets can be applied to inkjet printing on other indicator panels, such as measuring instruments for vehicles.

The invention claimed is:

1. A printing jig which supports an indicator panel to be printed and is placed in an inkjet-type printer when the indicator panel is being printed, the printing jig comprising:
    a mounting surface on which the indicator panel is to be placed; and
    a positioning part for positioning the indicator panel, the positioning part including a first protrusion preformed on the mounting surface so as to be brought into contact with at least part of the indicator panel placed on the mounting surface and a second protrusion having a shape similar to that of the first protrusion,
    wherein the indicator panel includes an uneven portion on a lateral side thereof, the uneven portion having projections and recesses in the circumferential direction of the indicator panel,
    the first protrusion is made of deposited and cured ink used by the inkjet-type printer and has a wall shape so as to surround the indicator panel placed on the mounting surface and be brought into contact with the lateral side of the indicator panel, and
    the second protrusion is made of the ink deposited and cured on the mounting surface outside the first protrusion so as to surround the first protrusion.

2. The printing jig according to claim 1, wherein
    the indicator panel is a flat-shaped member, and
    the first protrusion is placed so as to be brought into contact with a lateral side of the indicator panel at two or more positions, for positioning the indicator panel in a rotational direction and two perpendicular directions in the mounting surface.

3. The printing jig according to claim 1, wherein
    the indicator panel is a dial of a timepiece,
    the uneven portion of the dial is an engagement portion which is to be engaged with a movement or an inner frame holding the movement, and
    the first protrusion is placed so as to be brought into contact with at least the engagement portion of the dial.

4. The printing jig according to claim 1, wherein
    the indicator panel is a dial of a timepiece,
    the uneven portion of the dial includes a recess formed at a 12 o'clock position of the rim of the dial, and
    the first protrusion is formed so as to be brought into contact with the recess on the rim of the dial.

5. The printing jig according to claim 1, wherein the first protrusion has a cut on the circumference thereof.

6. The printing jig according to claim 1, wherein
the uneven portion of the indicator panel is asymmetric with respect to the center of the indicator panel, and
the first protrusion is placed so as to match the asymmetric uneven portion, in order that the indicator panel may not be placed on the mounting surface upside down.

7. The printing jig according to claim 1, wherein
the indicator panel is a timepiece component having a projection on a bottom thereof, and
the first protrusion is placed so as to be brought into contact with the projection of the timepiece component.

8. The printing jig according to claim 7, wherein the first protrusion has a recess into which the projection of the timepiece component placed on the mounting surface is fitted.

9. The printing jig according to claim 8, wherein the outer diameter of the first protrusion is smaller than that of the timepiece component.

10. The printing jig according to claim 1, wherein
the indicator panel is a timepiece component having an opening, and
the first protrusion is placed so as to be brought into contact with an inner wall of the opening of the timepiece component.

11. The printing jig according to claim 1, wherein
indicator panels on which different prints are to be made can be placed on the mounting surface side by side, and
markings respectively corresponding to the prints are printed in advance at respective positions on the mounting surface where the indicator panels are to be placed.

12. A method for manufacturing printed indicator panels, the method comprising the steps of:
forming the printing jig according to claim 1, comprising depositing ink by inkjet printing on a mounting surface of a jig plate or a jig sheet which can be placed in an inkjet-type printer, and
curing the ink to form the first protrusion and a second protrusion;
placing an indicator panel to be printed on the mounting surface so that at least part of the indicator panel comes into contact with the first protrusion, thereby positioning the indicator panel relative to the first protrusion; and
inkjet printing on the indicator panel.

13. The method according to claim 12, wherein the same printer is used in the steps of forming the printing jig and inkjet printing on the indicator panel.

\* \* \* \* \*